(12) United States Patent
Voelkert

(10) Patent No.: US 7,243,769 B2
(45) Date of Patent: Jul. 17, 2007

(54) DUAL MOTION ACTUATOR

(75) Inventor: Randall Voelkert, Richmond, MI (US)

(73) Assignee: ByTec, Inc., Clinton Township, MI (US)

( * ) Notice: Subject to any disclaimer, the term of this patent is extended or adjusted under 35 U.S.C. 154(b) by 304 days.

(21) Appl. No.: 10/774,937

(22) Filed: Feb. 9, 2004

(65) Prior Publication Data
US 2004/0200298 A1    Oct. 14, 2004

Related U.S. Application Data

(60) Provisional application No. 60/446,134, filed on Feb. 10, 2003.

(51) Int. Cl.
*F16D 27/08* (2006.01)

(52) U.S. Cl. ............... 192/48.2; 192/84.91; 192/84.92; 74/325; 74/665 H

(58) Field of Classification Search ........... 74/325, 74/664, 665 H, 665 F, 665 P; 192/48.91, 192/84.92
See application file for complete search history.

(56) References Cited

U.S. PATENT DOCUMENTS

| | | | |
|---|---|---|---|
| 2,962,139 A * | 11/1960 | Straub | 192/18 B |
| 4,170,276 A | 10/1979 | Hashimoto et al. | |
| 5,045,741 A | 9/1991 | Dvorsky | |
| 5,920,158 A * | 7/1999 | Miller et al. | 318/4 |
| 5,920,159 A * | 7/1999 | Miller et al. | 318/4 |
| 6,073,995 A | 6/2000 | Klein | |
| 6,075,298 A * | 6/2000 | Maue et al. | 310/12 |
| 6,126,132 A | 10/2000 | Maue | |
| 6,321,488 B1 | 11/2001 | Bigoszewski et al. | |
| 6,637,572 B2 * | 10/2003 | Tomari et al. | 192/48.2 |
| 6,902,048 B1 * | 6/2005 | Chung | 192/48.2 |

FOREIGN PATENT DOCUMENTS

| | | |
|---|---|---|
| DE | 1171215 B | 5/1964 |
| DE | 19755942 A1 | 7/1999 |

OTHER PUBLICATIONS

International Search Report, Issued Jul. 5, 2004 in connection with corresponding international patent application.

* cited by examiner

*Primary Examiner*—Saul Rodriguez
(74) *Attorney, Agent, or Firm*—Baker & Daniels LLP

(57) ABSTRACT

An actuator is disclosed which can be used in multiple applications, and which provides both linear and rotary outputs. The device comprises a motor driven rotor having clutch plates on both sides thereof. One clutch plate includes a gear driven output, and the other clutch plate drives a linear rack for the linear output. An electromagnet controls the engagement of the first and second clutches.

45 Claims, 37 Drawing Sheets

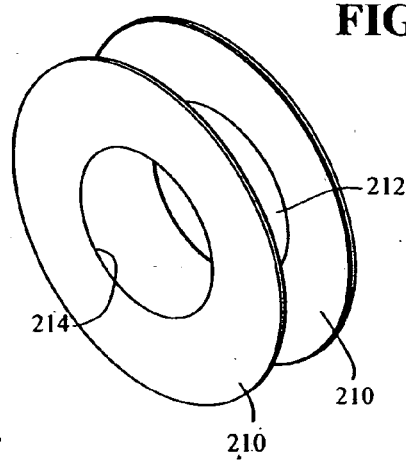
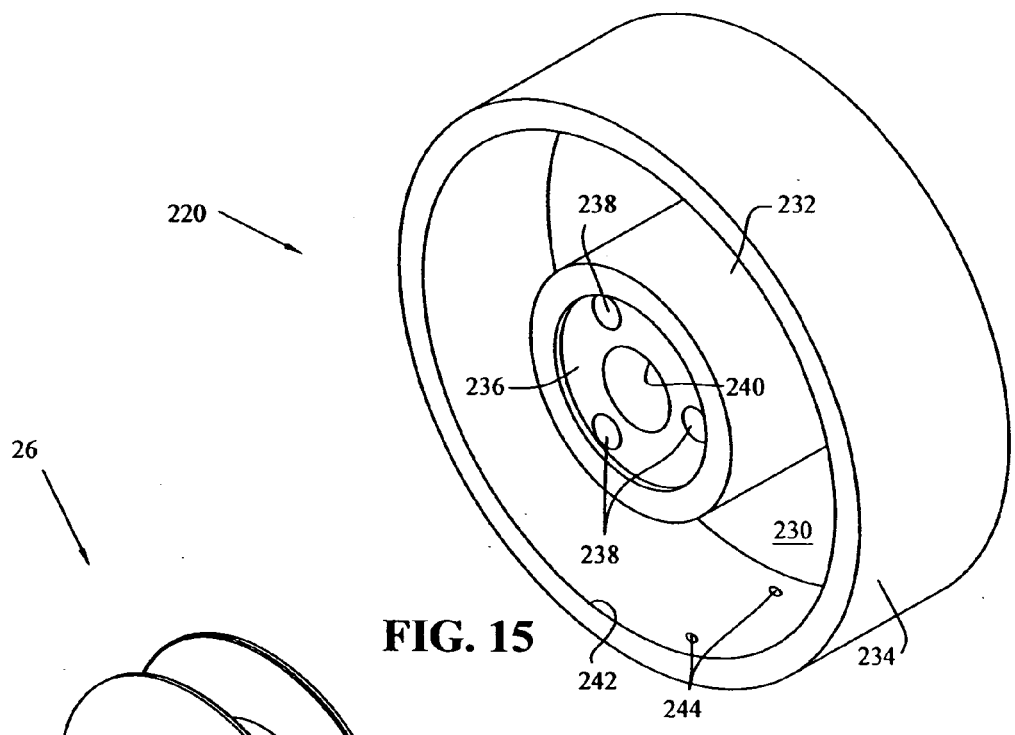
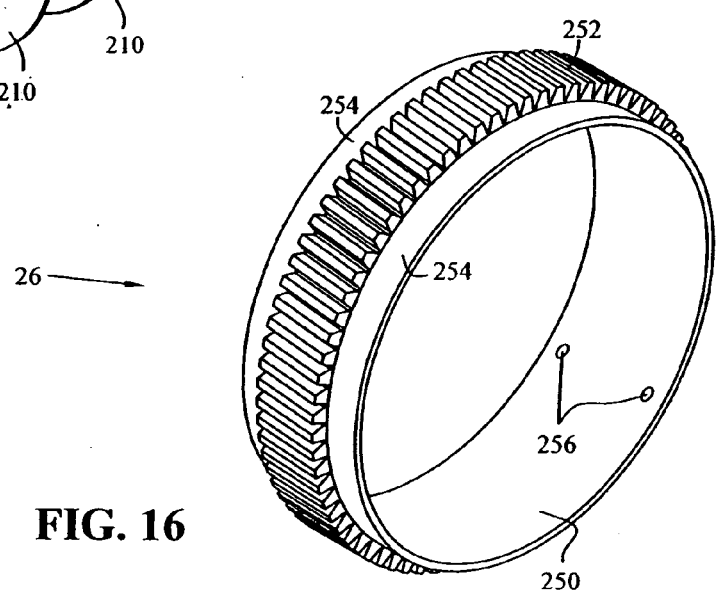
FIG. 14
FIG. 15
FIG. 16

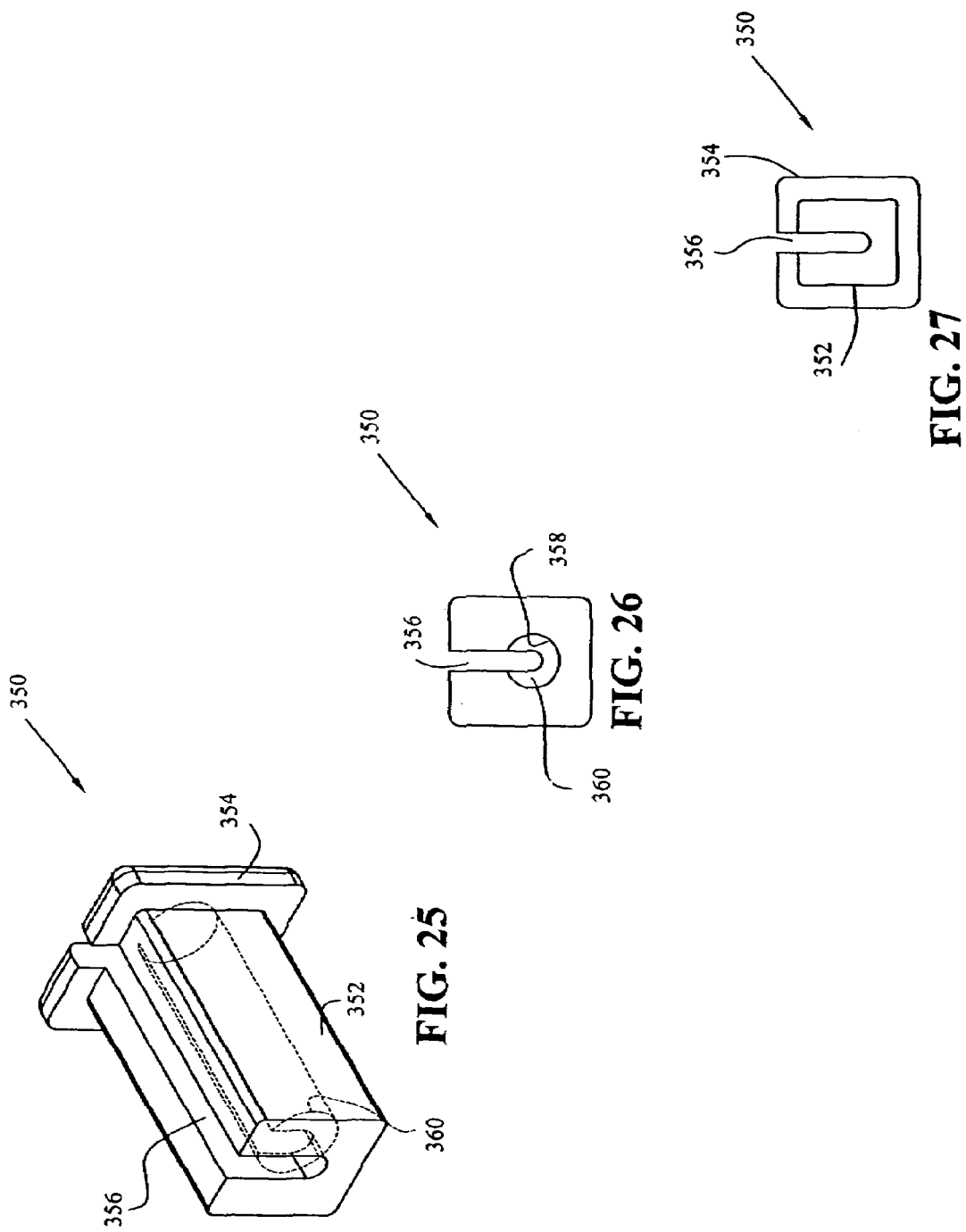

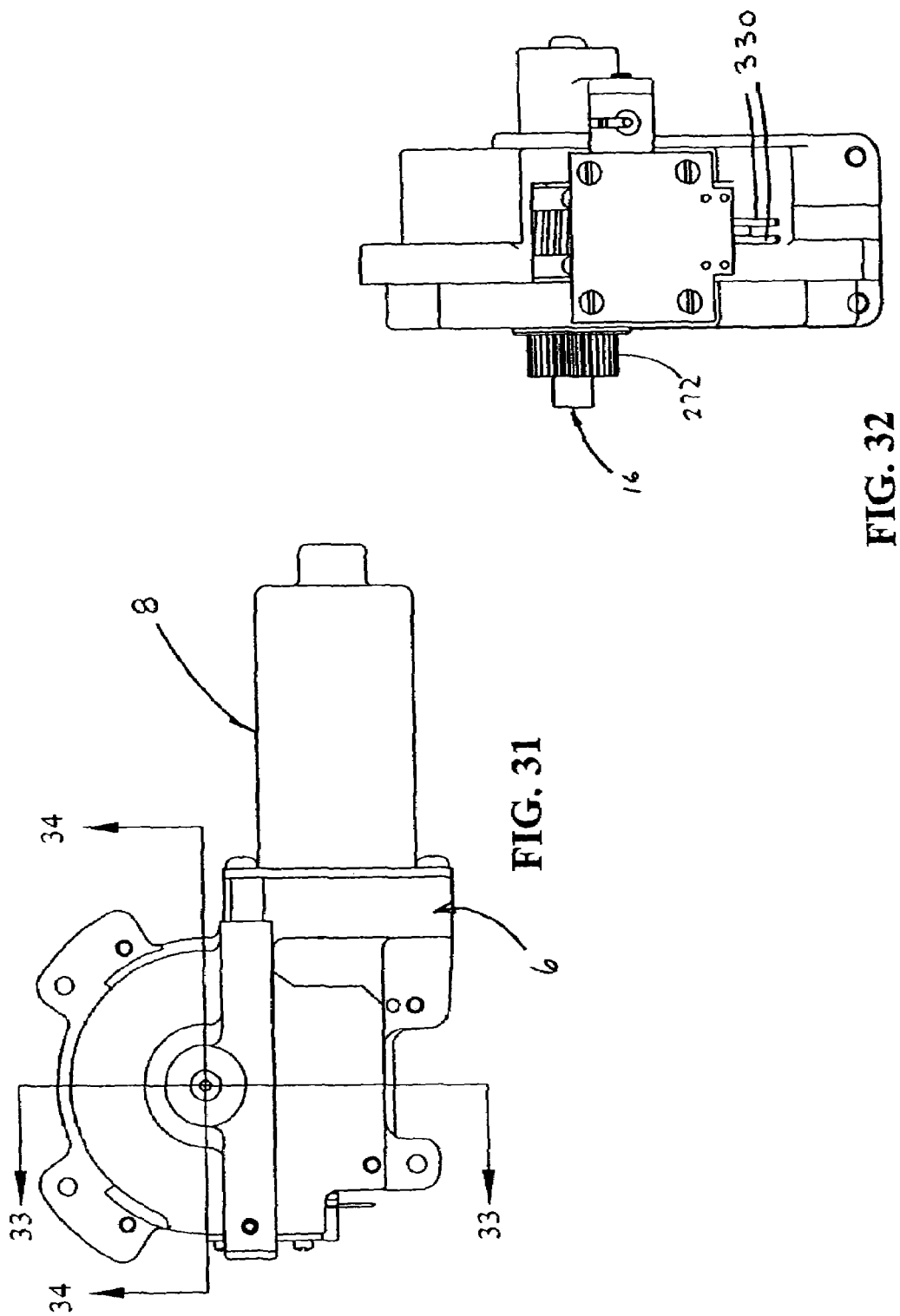

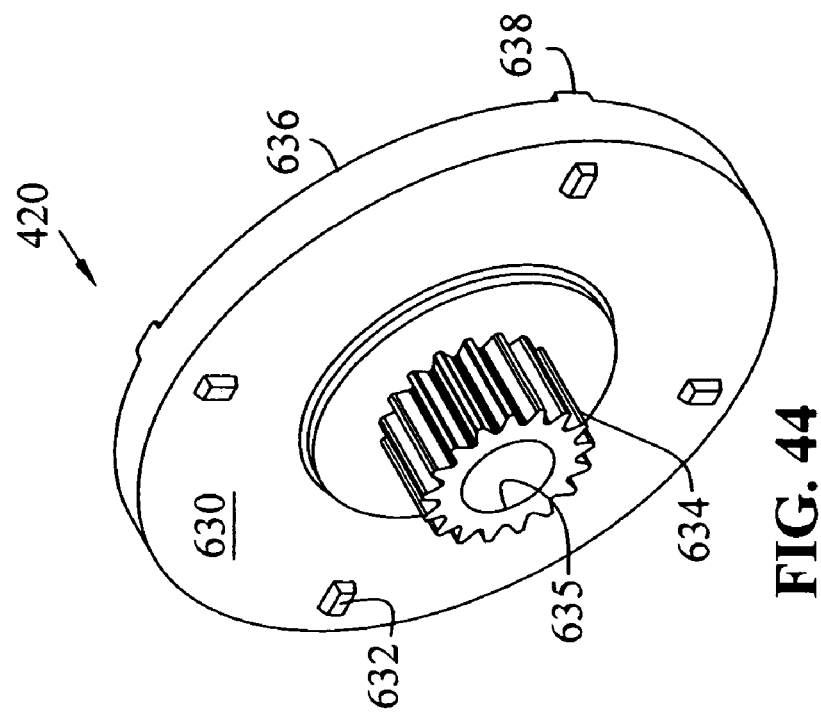
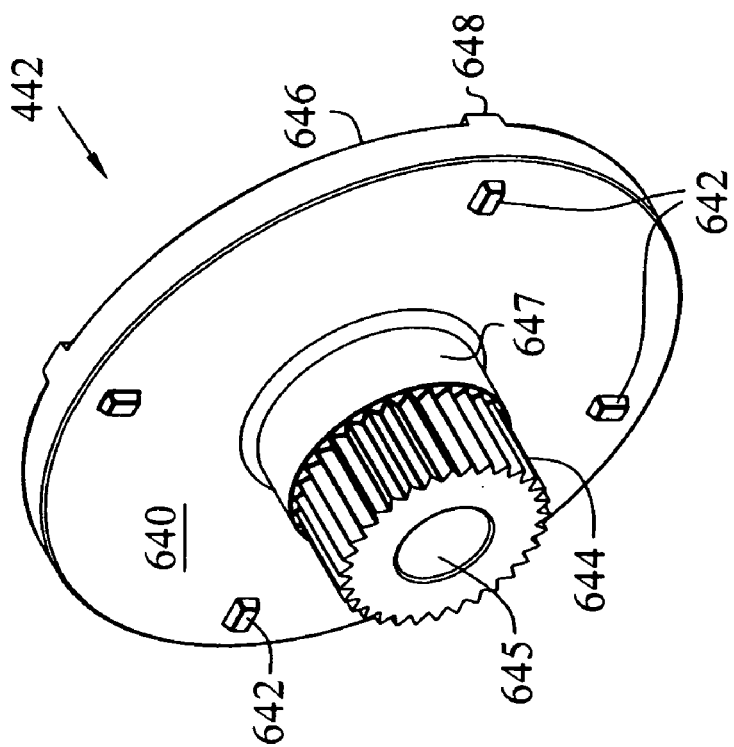
FIG. 44
FIG. 43

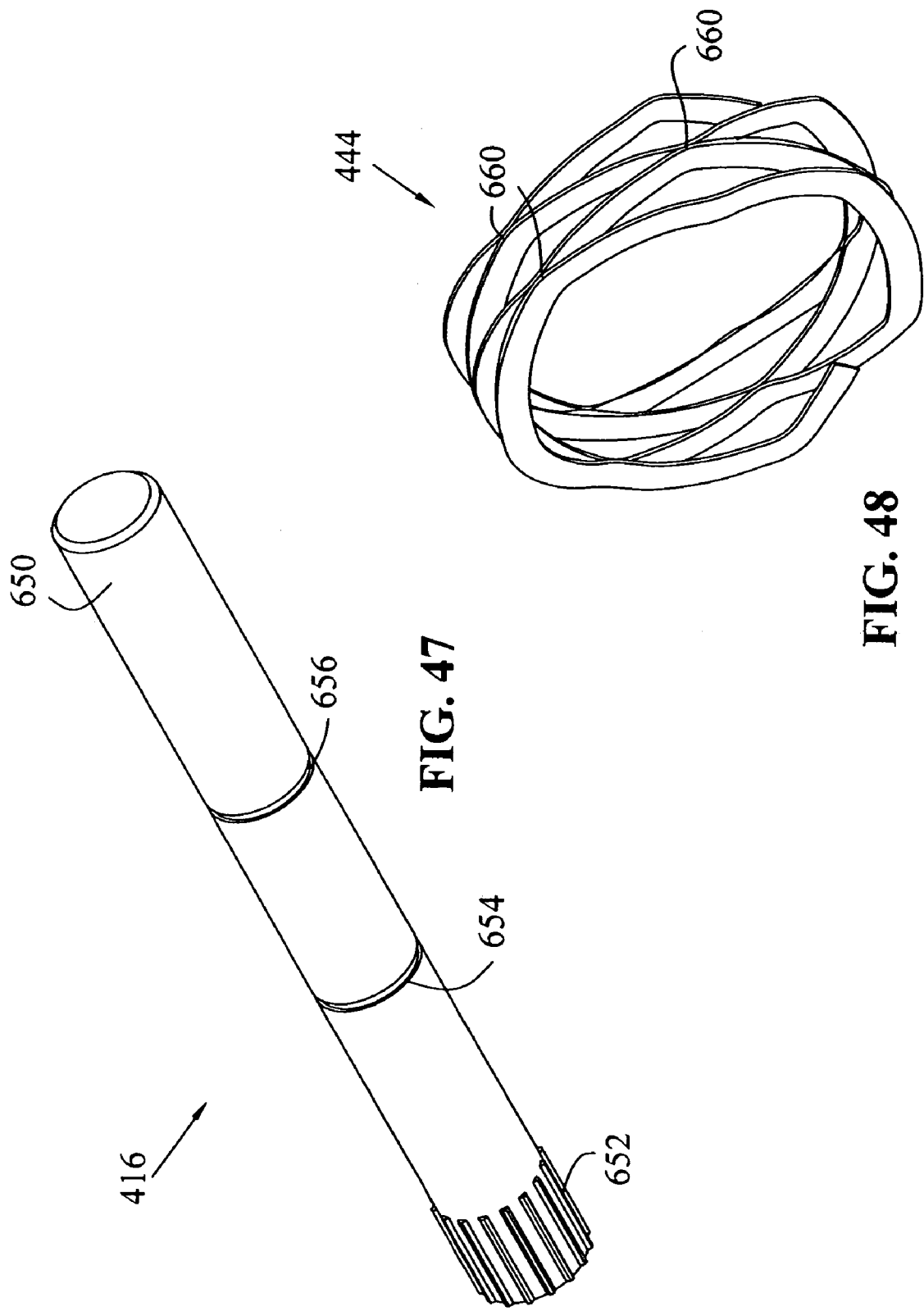

DUAL MOTION ACTUATOR

This application claims the benefit of U.S. Provisional Patent Application Ser. No. 60/446,134 filed Feb. 10, 2003, the complete disclosure of which is hereby expressly incorporated by reference.

BACKGROUND OF THE INVENTION

The invention is directed to an actuator which has multiple possible directions of motion.

Many different devices require multiple different senses of motion. For example, many different actuators are required for the automotive field, industrial industry, for machine tools, and the like. It would be advantageous if an actuator had multiple modes of actuation in the same unit.

One device is shown in U.S. Pat. No. 5,045,741 where an actuator has both rotary motion and linear motion, for such uses as an automotive starter. This device has little linear motion capability as the linear motion is provided by allowing the shaft and armature to shift axially. Moreover, the linear force capabilities would be to low to achieve many functions required of such multiple motion actuation applications. Another device is shown in DE 197 55 942 where a common motor is used for a window regular and the door close mechanism.

SUMMARY OF THE INVENTION

The objects of the invention have been accomplished by providing a drive assembly, for alternate rotational and linear output, where the assembly comprises an input power source providing rotational input; a clutch assembly having a driven portion, driven by the input power source, and at least two output driving portions, a first of the output driving portions being linear output and a second of the output driving portions being rotational output.

In another aspect of the invention, an electromagnetic clutch drive assembly, comprises a central shaft; and a ring gear assembly, rotatably mounted to the shaft. The ring gear assembly is comprised of a ferromagnetic rotor member, the rotor member having an open core portion, a ring gear positioned on an external circumferential periphery of the rotor, a bobbin of magnetic wire windings positioned within the core of the ring gear, and contacts to energize the windings to define a magnetic field. A first clutch plate is rotatably mounted to the shaft and positioned on a first side of the ring gear assembly, and is in a normally disengaged position with the ring gear assembly. A second clutch plate is rotatably mounted to the shaft and positioned on an opposite side of the ring gear assembly as the first clutch plate, and is in normal contact with the ring gear assembly. Engagement members extend between the first and second clutch plates, wherein the lateral shifting of one of the clutch plates causes the lateral shifting of the other of the clutch plates out of engagement with the ring gear assembly. Thus, the ring gear defines an electromagnet to draw one of the clutch plates into driving engagement with the ring gear, such that when the windings are energized, the one clutch plate is drawn into engagement with the ring gear and is driven by the ring gear.

In yet another embodiment of the invention, an electromagnetic clutch drive assembly, comprises a housing assembly, comprised of a main housing portion and a cover portion. A central shaft is positioned within the housing assembly. An input power source provides rotational input. An electromagnetic clutch assembly has a driven portion, driven by the input power source, and at least two output driving portions. A first of the output driving portions is linear output and a second of the output driving portions is rotational output, whereby activation of an electromagnet of said electromagnetic clutch assembly controls the output between the first and second output driving portions.

BRIEF DESCRIPTION OF THE DRAWINGS

The invention will now be described with relation to the drawings, where:

FIG. 14 shows a perspective view of the bobbin, which makes up the electromagnet of the present invention;

FIG. 15 shows a perspective view of the central rotor of the present invention;

FIG. 16 shows a perspective view of a ring gear used in the present invention;

FIG. 25 is a rear perspective view of the cable retainer used in the present invention;

FIGS. 26 and 27 are front and rear plan views of the retainer of FIG. 25, respectively;

FIG. 31 shows a side plan view of the fully assembled dual actuator;

FIG. 32 shows an end view of the actuator of FIG. 31;

FIGS. 43 and 44 show an enlarged view of the clutch plates of the electromagnetic clutch assembly of FIG. 41;

FIG. 47 shows an enlarged view of the shaft which is installed in the housing portion shown in FIGS. 36 and 37;

FIG. 48 shows an enlarged view of the compression spring-shown in FIG. 41;

DETAILED DESCRIPTION OF THE INVENTION

Figure 1:
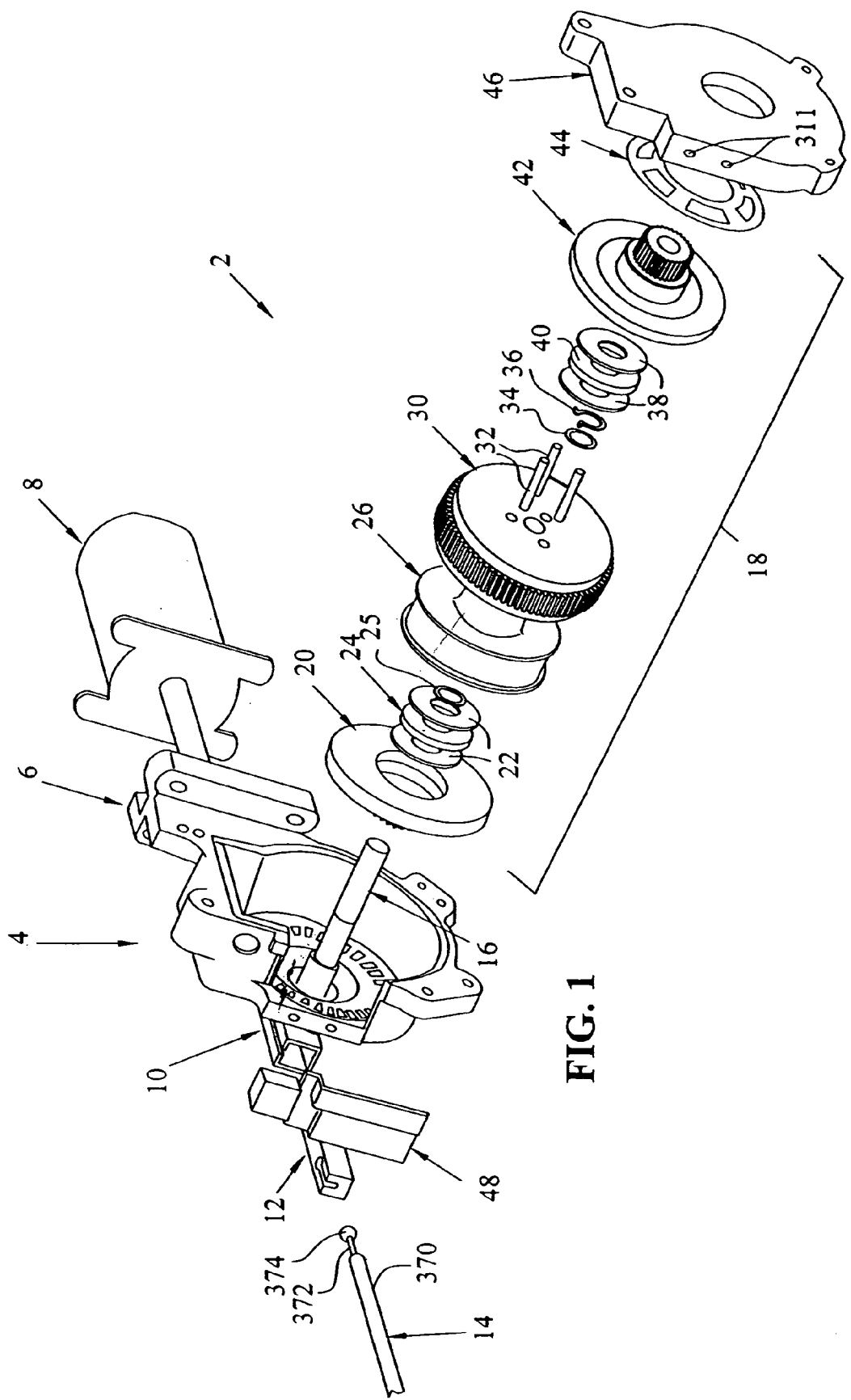
FIG. 1 shows an exploded perspective view of the dual actuator of the present invention.

With respect first to FIG. 1, the present invention relates to a dual actuator, which can operate in two separate phases. That is, with one actuator, two different and separate modes can be operated as described herein. As shown in FIG. 1, the dual actuator is generally referred to as reference numeral 2, which comprises a main housing portion 4 having a mounting flange 6 for attaching an electric motor 8. Housing 4 also includes an integrated slide 10 for receipt of a rack 12, which in turn is fixed to a bowden cable 14. A central shaft 16 is fixedly mounted in main housing 4 and coaxially receives the dual clutch assembly referred to generally as 18. The assembly 18 is comprised of first clutch plate 20, thrust washers 22, which sandwich a thrust bearing 24, together with a thrust washer 25. The assembly 18 further includes bobbin 26, rotor assembly 30, thrust rods 32, thrust washer 34, split lock ring 36, thrust washers 38, thrust bearing 40, second clutch plate 42, and return spring 44. An end cover 46 completes the assembly, as will be described herein. Finally, a brush plate assembly 48 is included, which also will be described further herein.

Figure 3:
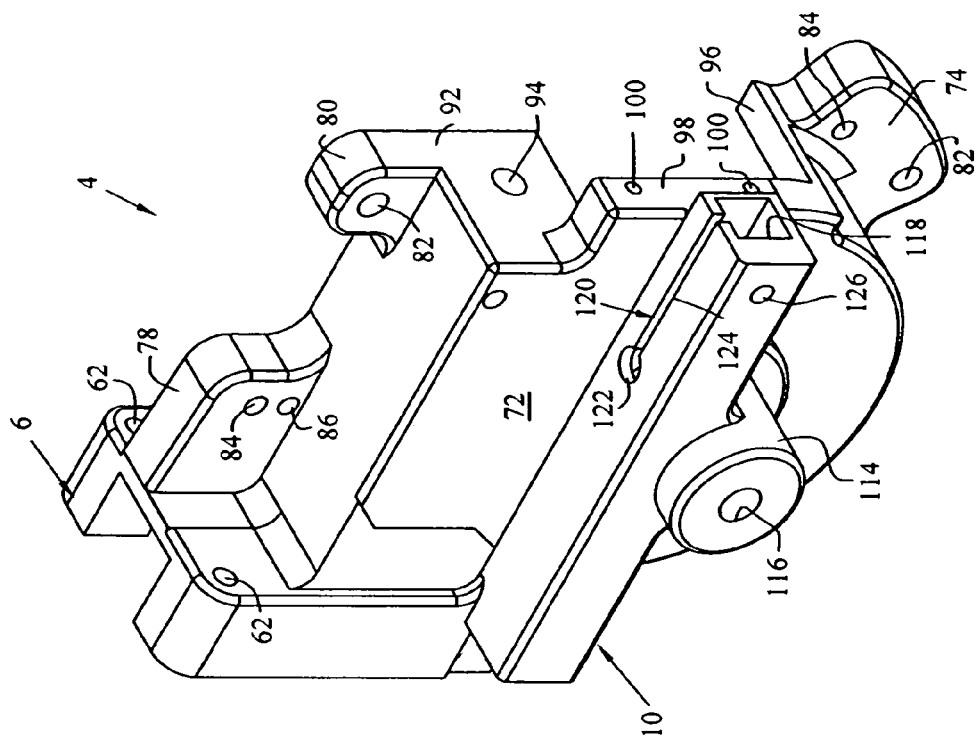
FIG. 3 shows a rear perspective view of the main housing of the actuator of FIG. 2.
Figure 2:
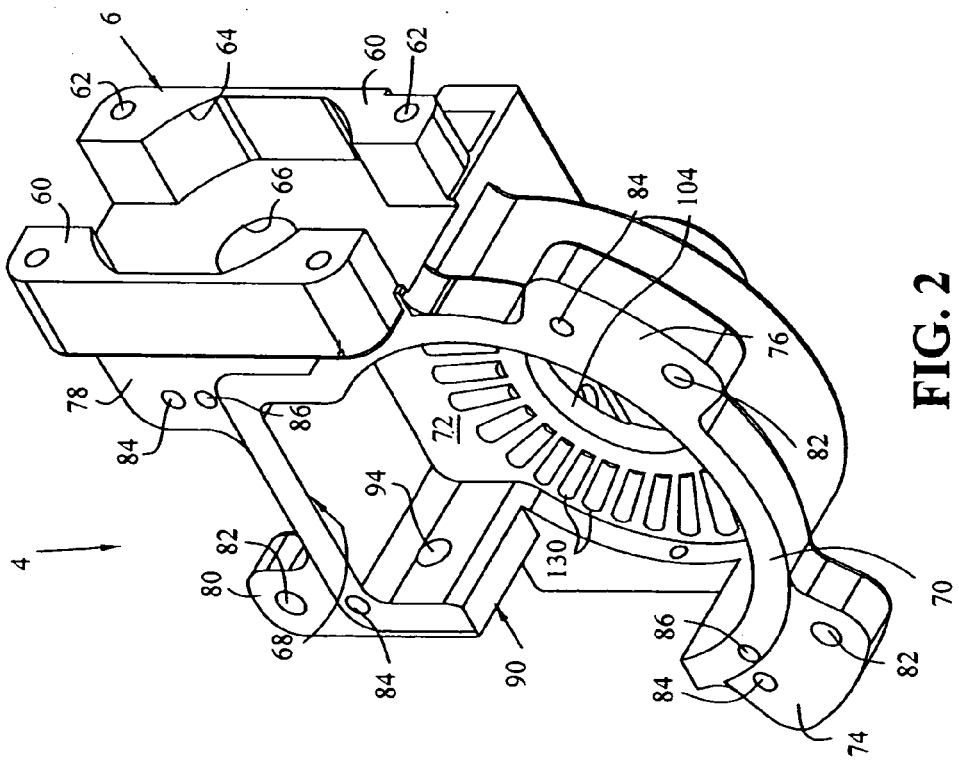
FIG. 2 shows a perspective view of the main housing portion of the actuator of FIG. 1.

With respect now to FIGS. 2–6, the main housing portion will be described in greater detail. As shown in FIGS. 2 and 3, housing portion 4 includes mounting flange 6 having a mounting face 60 with tapped mounting apertures at 62. The mounting flange 6 opens to an enlarged cavity portion 64 and further includes an opening 66, which communicates between the flange portion into an inner cavity portion 68 of the housing portion 4. The inner cavity portion 68 is generally defined so as to receive the clutch assembly 18 (FIG. 1) and therefore takes on a generally cylindrical configuration by way of cylindrical wall 70, which upstands from and is integrated with rear wall 72. Cylindrical wall 70 includes mounting ears 74, 76, 78, and 80, including representative mounting apertures 82, tapped apertures 84, and locating dowl apertures 86.

Cylindrical wall 70 is interrupted on one side to form an opening at 90, which is generally defined by side wall portion 92 having an aperture 94 there through, edge portion 96, and a generally planar edge at 98 having tapped mounting apertures 100, as further described herein. As shown best in FIGS. 2 and 4, rear wall 72 further includes a central opening 104, which includes a first diametrical portion 106 extending rearwardly to outwardly projected face 108, and a second diametrical portion 110, which extends inwardly to face 112. As shown best in FIGS. 3 and 4, diametrical portion 110 is a machined section internal to a post section 114, which extends transversely of rear wall 72. It should also be noted that post section 114 intersects the guide member 10, which houses rack 12. Post section 114 has a central aperture 116, which extends from an exterior, as shown in FIG. 3, and extends inwardly through face 112, as shown in FIG. 4.

Figure 4:
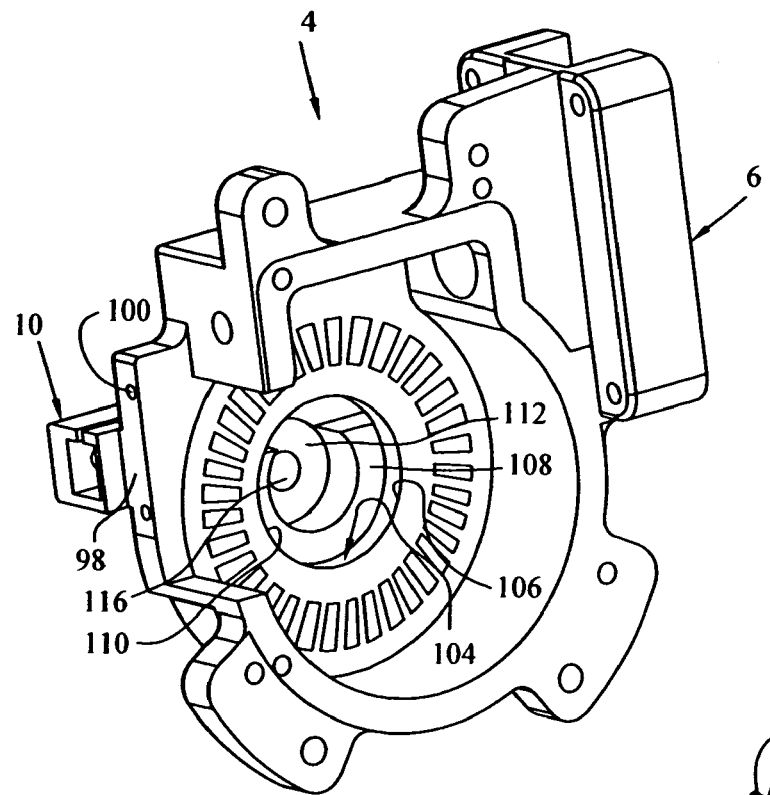
FIG. 4 shows an upper perspective view of the actuator housing of FIGS. 2 and 3.
Figure 5:
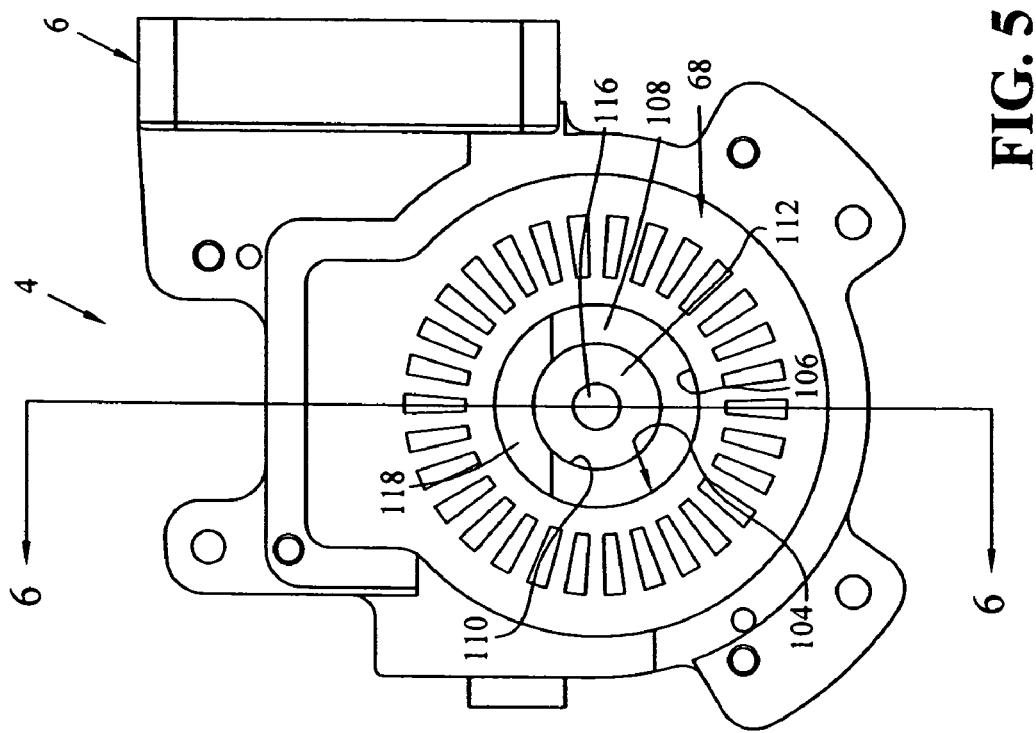
FIG. 5 is an inside plan view of the main housing of FIGS. 2–4.
Figure 6:
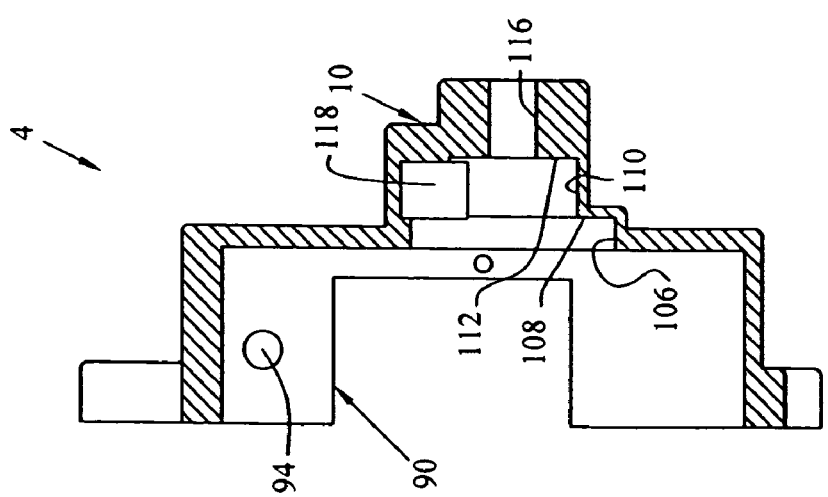
FIG. 6 is a cross-sectional view through lines 6—6 of FIG. 5.

With respect now to FIGS. 4–6, diametrical portions 106 and 110 intersect a guide channel 118 through the guide member 10 to form a common area. As best shown in FIG. 3, the guide member 10 includes a cable-receiving opening at 120, including an enlarged opening portion 122 and a cable-receiving portion 124. A mounting aperture is positioned at 126, which will be described further herein. Finally, as best shown in FIG. 2, the inner wall 72 includes a plurality of integral raised radial ribs 130 radially disposed around diametrical portion 106, as will be further described herein.

Figure 7:
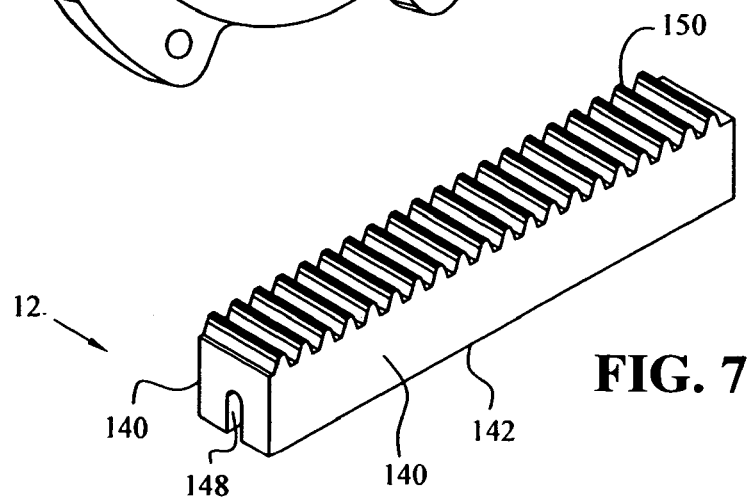
FIG. 7 is a perspective view of the rack used for one phase of the actuation.
Figure 8:
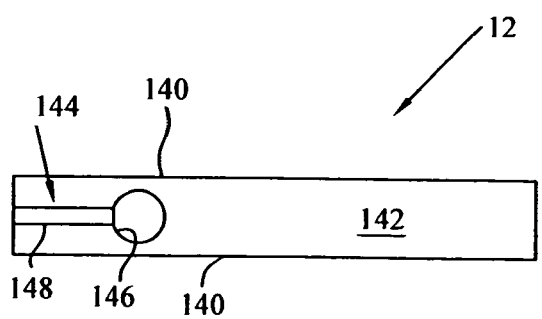
FIG. 8 is an underside plan view of the rack of FIG. 7.

With respect now to FIGS. 7 and 8, rack member 12 is shown as a generally linear rack and includes side walls 140 and top wall 142, including a cable-receiving opening 144 having enlarged portion 146 and a cable-receiving portion 148. Rack member 12 further comprises a plurality of rack teeth 150 on the side opposite face 142. It should be appreciated that the general profile of linear rack 12 is such that it is received in guide channel 118 in guide member 10.

Figure 9:
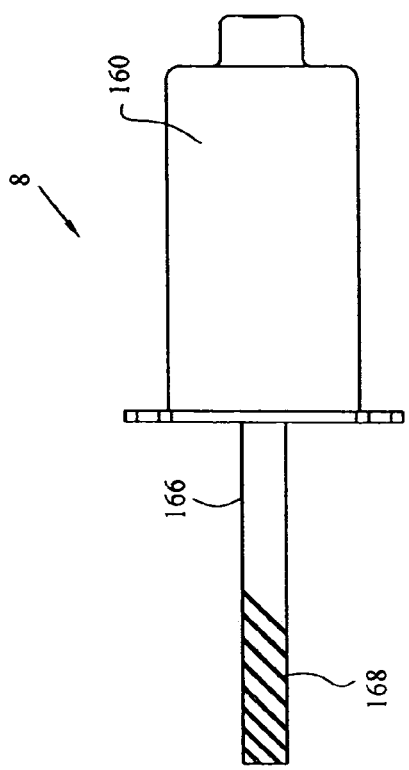
FIG. 9 is a side plan view of the electric motor of the present invention.
Figure 10:
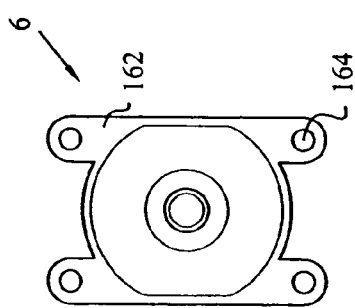
FIG. 10 is an end view of the motor of FIG. 9.

With respect now to FIGS. 9 and 10, motor 8 is generally comprised of a motor section 160 having a shaft 162 with mounting apertures 164 and a shaft section 166 having splined teeth 168.

Figure 11:
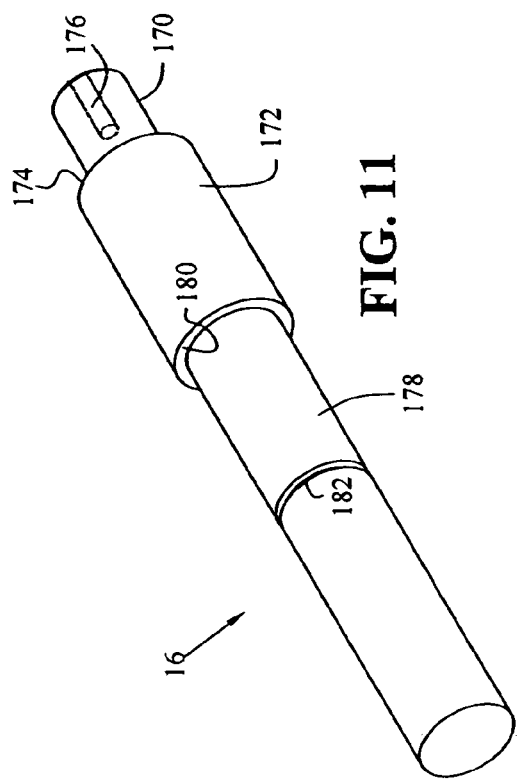
FIG. 11 is a perspective view of the fixed shaft of the present invention.

With respect now to FIG. 11, central shaft 16 is shown having a first diametrical section 170, with an enlarged diametrical section at 172, thereby defining shoulder 174.

An end face of diametrical section 170 includes a tapped aperture (shown in phantom) at 176. Shaft 16 further includes diametrical section 178, which together with diametrical section 172 forms shoulder 180. Diametrical section 178 further includes an undercut channel at 182 to receive retaining ring 36, as will be described further herein.

Figure 12:
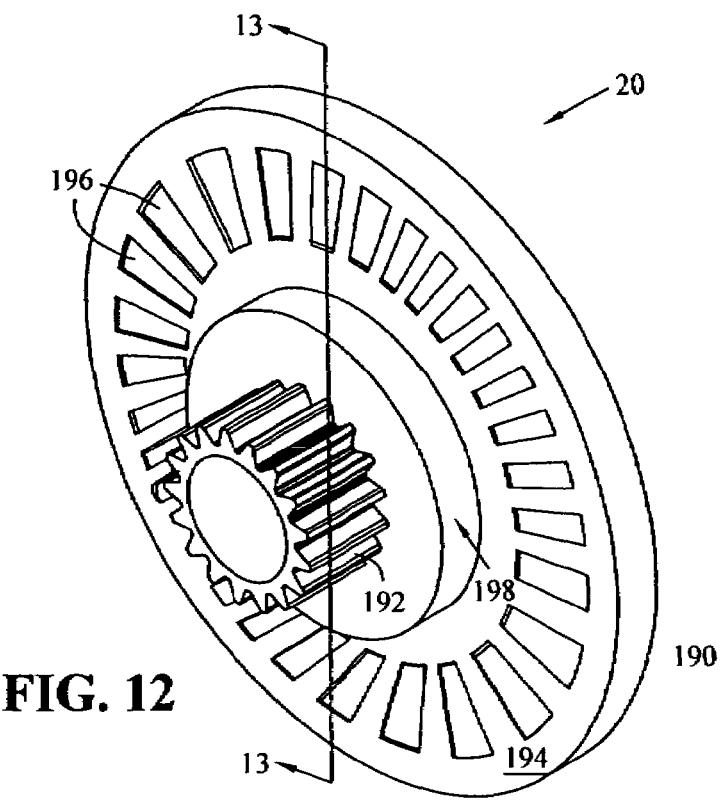
FIG. 12 shows a perspective view of a clutch plate used for one phase of the dual actuator of the present invention.
Figure 13:
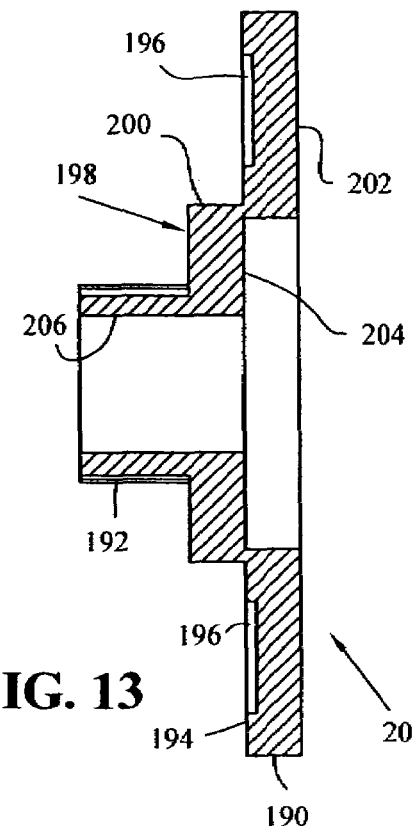
FIG. 13 is a cross-sectional view through lines 13—13 of FIG. 12.

With respect now to FIGS. 12 and 13, first clutch plate 20 is shown, which is generally comprised of a clutch plate 190 and a spur gear 192. Clutch plate 190 includes a face 194 having a plurality of radially arranged recesses 196 in a matching array to radially arranged ribs 130 (FIG. 2). Clutch plate 20 further includes a raised diametrical portion 198 having an outer diameter 200 slightly smaller than diametrical opening 106 (FIG. 5). Clutch plate further includes on the opposite side, rear face 202 having an annular recess at 204, which communicates with throughbore 206. It should also be appreciated that throughbore 206 is generally profiled to be rotatably received on diametrical portion 172 (FIG. 11) of shaft 16. It should also be appreciated that the teeth of spur gear 192 are generally sized for meshing engagement with teeth 150 of rack 12 (FIG. 7).

Figure 17:
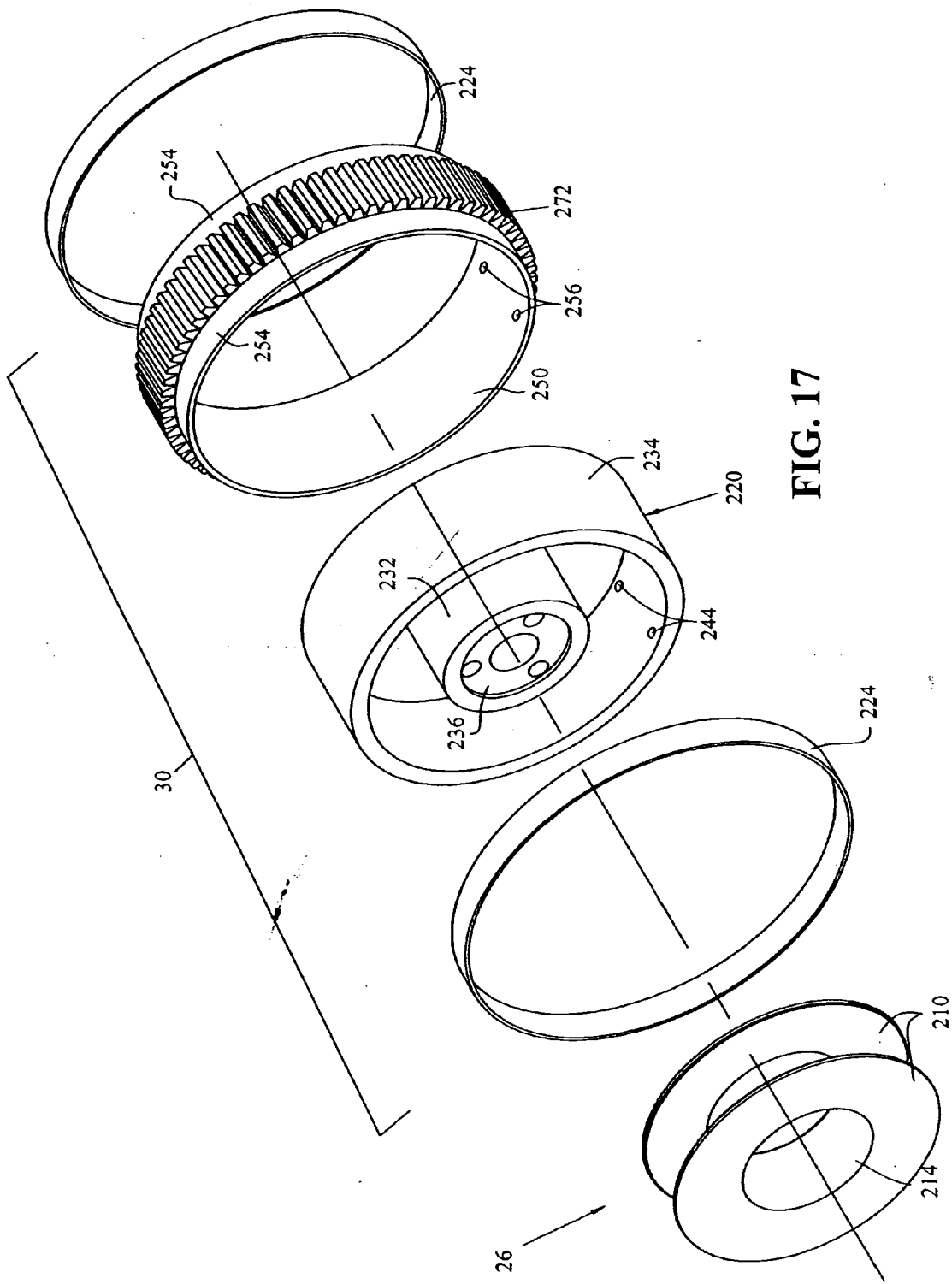
FIG. 17 shows an exploded view of the bobbin of FIG. 14, the rotor of FIG. 15, and the ring gear of FIG. 16, in exploded view together with slip rings.

With reference now to FIG. 14, bobbin 26 is shown having outer flanges 210 and an inner spool portion at 212. It should be appreciated that bobbin 26 is profiled to receive a plurality of windings of magnet wire, as will be further described herein. With respect now to FIGS. 15–17, rotor assembly 30 is shown as including rotor 220, ring gear 222 and slip rings 224. As shown in FIG. 15, rotor 220 includes a central wall portion 230 having a hub 232 extending outwardly therefrom, together with a cylindrical wall 234. Central hub portion 232 includes a recessed face at 236 extending inwardly from the end of hub 232, which further includes apertures 238 and a central bore at 240. Cylindrical wall 234 includes an inner surface at 242 with apertures 244 extending entirely through the wall, as will be described in greater detail herein.

With respect now to FIG. 16, ring gear 222 includes a cylindrical ring portion 250 having an inner diameter, which is interferingly fit with the outer diameter of rotor portion 220. Ring 22 further includes a central integral ring gear portion 252 flanked by bands 254. Apertures 256 extend through ring 250, as shown in FIG. 16, and are positioned to open onto bands 254, as well as are profiled to match apertures 244. With reference again to FIG. 17, it should be appreciated that the inner diameter 214 of bobbin 26 is profiled for interferingly fitting over hub 232, that ring 250 is profiled for interferingly fitting over cylindrical wall portion 232 (with apertures 244 and 256 aligned), and that slip rings 224 are profiled for receipt over band portions 254. Preferably, the ring gear is formed from an insulating material, such as a plastics material, for reasons which will become clear, as discussed herein.

Figure 18:
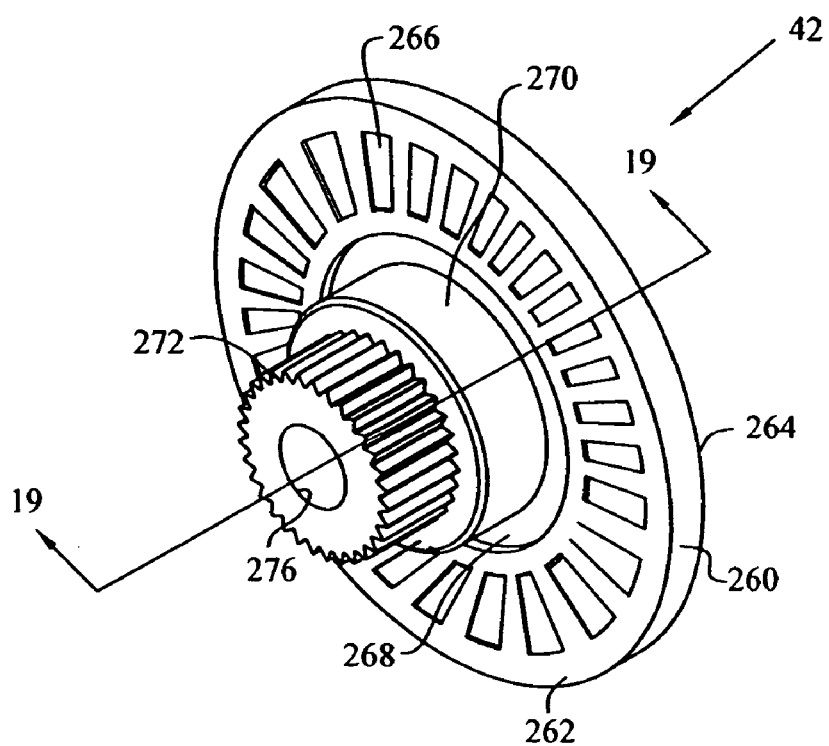
FIG. 18 shows a second clutch plate used with a second phase of the dual actuator.
Figure 19:
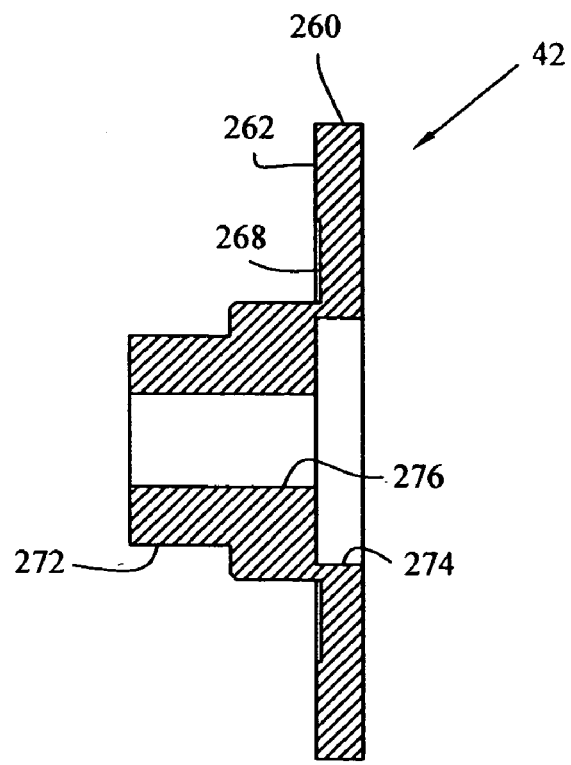
FIG. 19 shows a cross-sectional view through lines 19—19 of FIG. 18.

With respect now to FIG. 18, second clutch 42 generally includes a clutch plate 260 having a front face 262 and a rear face 264. As shown in FIG. 18, front face 262 includes a plurality of recesses 266 and a recessed portion at 268. The recessed portion 268 surrounds a diametrical portion 270, which projects gear portion 272 forwardly therefrom. As shown in FIG. 19, clutch 42 includes an annular recess at 274 coaxially disposed relative to a through bore at 276.

Figure 20:
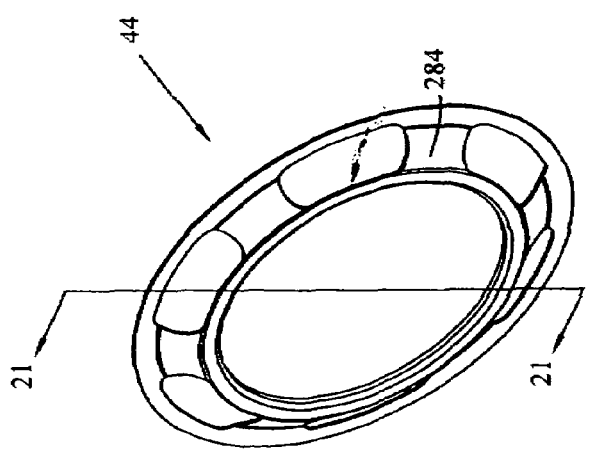
FIG. 20 shows a perspective view of the return spring.
Figure 21:
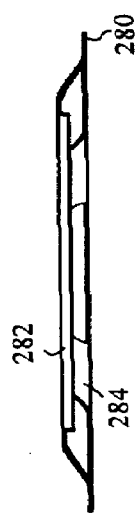
FIG. 21 shows a cross-sectional view through lines 21—21 of FIG. 20.

With reference now to FIGS. 20 and 21, return spring 44 is shown as a stamped and formed disk of spring material, which includes an outer annular flange portion 280, an inner annular ring section at 282, and individual spring legs 284, which extend between the two. It should be appreciated that in the cross-sectional view of FIG. 21, spring member 44 is shown in its free state, where ring portion 282 and flange 280 are spaced apart, but as shown further herein, this annular spring can deflect such that the vertical distance between ring 282 and flange 280 is reduced.

Figure 22:
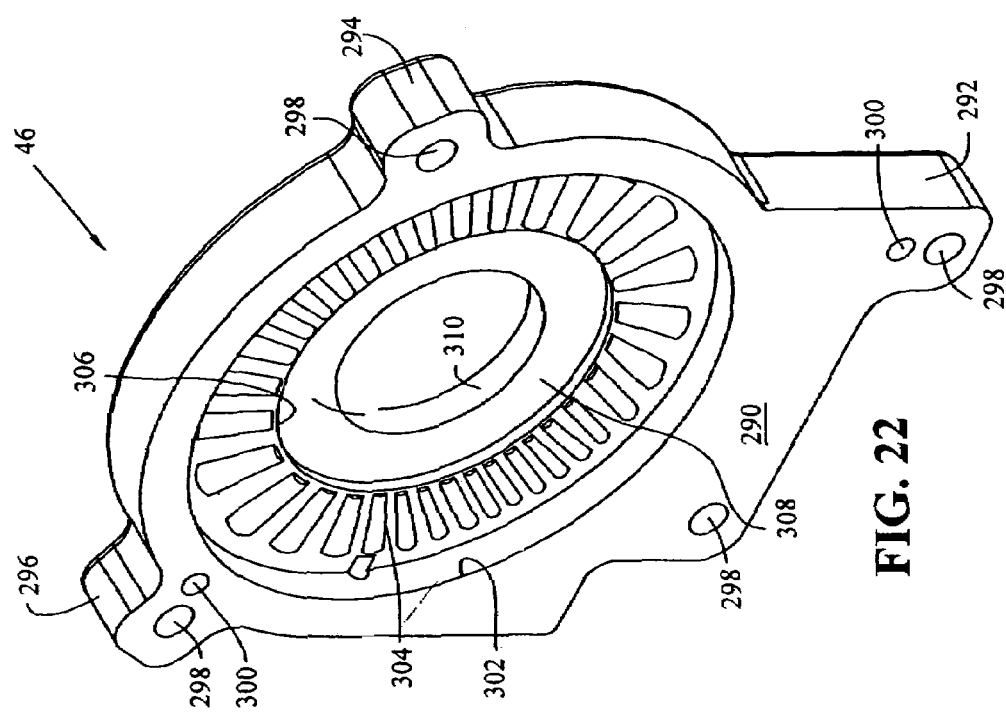
FIG. 22 shows a perspective view of the end cover of the present invention.

With respect now to FIG. 22, end cap 46 is shown including a mounting face 290, mounting ears 292, 294, and 296, with apertures 298 being positioned for mounting cover 46 and dowl openings 300 for locating the cover relative to housing 4, as further described herein. Cover 46 also includes a diametrical recess 302, which extends rearwardly to define face 304. Face 304 includes an undercut recess at 306 to defined face 308. Finally, cover 46 includes an annular opening at 310, which is generally profiled to receive hub portion 270 (FIG. 18) there through.

Figure 24:
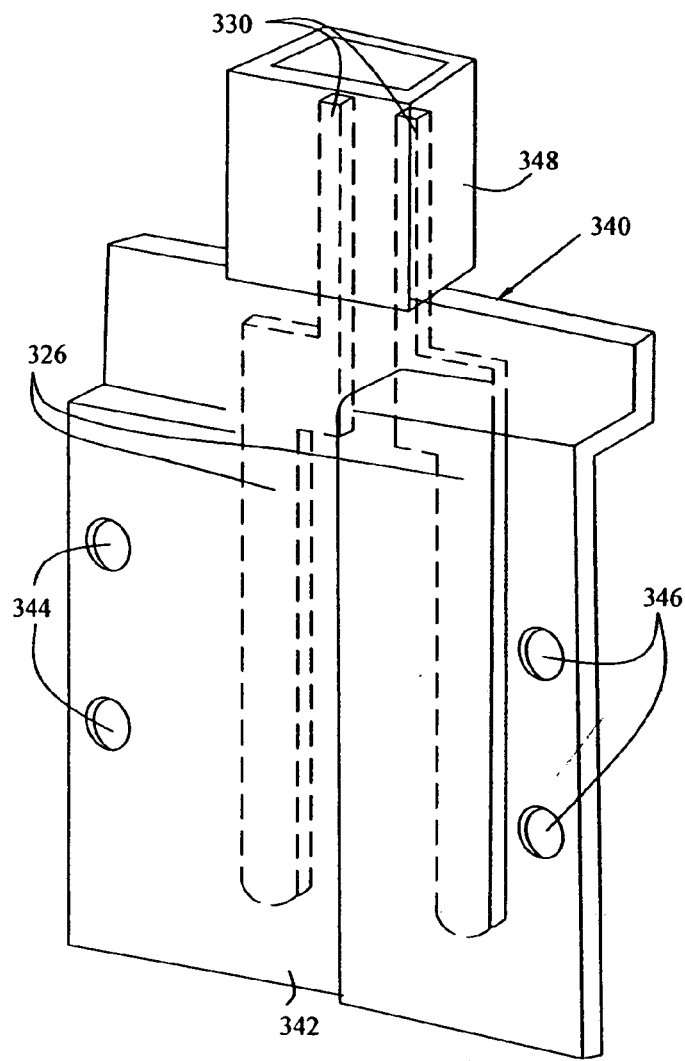
FIG. 24 shows a perspective view of the connector housing of the present invention.
Figure 23:
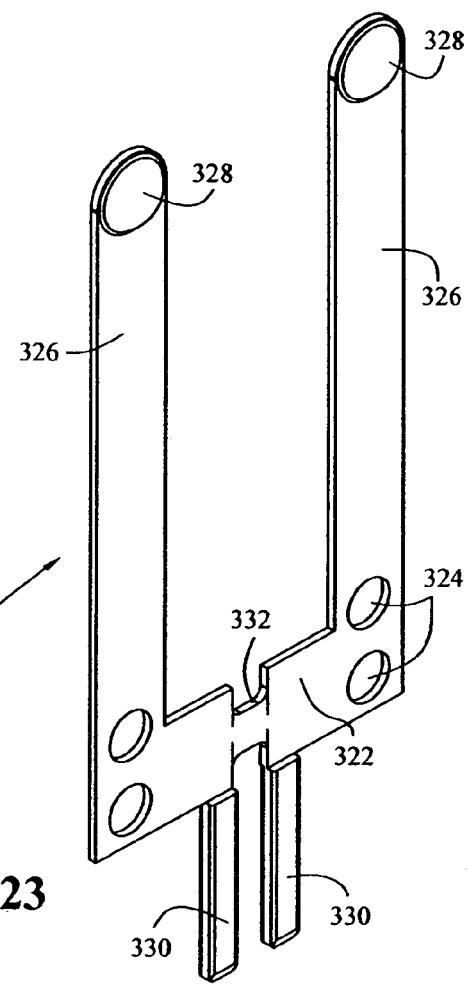
FIG. 23 shows a perspective view of the brushes used with the present invention.

With respect now to FIG. 23, a brush plate is shown as 320, including a transverse bar portion 322 having apertures 324 there through. Bar 322 includes brush contacts 326 extending therefrom with rounded contact portions at 328. The opposite end of bar portion 322 includes stamped and formed contacts 330, which together form pin contacts, as described herein. Finally, as shown in phantom, an intermediate portion is shown at 332, which will be later removed to separate the two contacts. In the preferred embodiment of the invention, contacts are made from a highly conductive material, such as beryllium copper, but other materials or alloys could also be used. With respect now to FIG. 24, brush plate assembly 48 is shown with an overmolded housing portion 340 having a cover portion at 342 having apertures 344, 346 there through, and an integral connector housing portion at 348. Connector terminal portions 330 are positioned within the connector housing portion 348, and terminal portions 326 extend downwardly from the connector portion 348 but are not encapsulated within the plastic.

With respect now to FIGS. 25–27, a cable-retaining member 350 is disclosed having a generally square body portion at 352 and an outer flange 354. A slot 356 extends the entirety of the length of the retainer 350 and intersects a cylindrical aperture 358, which extends only part way along body portion 352, forming shoulder 360. With the components as described above, the assembly of the device will now be further described.

With reference again to FIG. 1, bowden cable 14 is shown as including outer sheath 370 having an internally movable cable 372 having an end ball 374 for gripping the cable 372. The assembly begins by placing the cable 372 into slot 356 of retainer 350 (FIGS. 25–27) with the end of the sheath 370 abutting shoulder 360 of the retainer. This positions the end ball 370 proud of the retainer 350, whereupon ball 374 can be positioned in opening 146 of rack 12 (FIG. 8) with the remaining cable portion 372 positioned in slot 148. The rack 12 and the retainer 350 can thereafter be slidably received into opening 118 (FIG. 3) of guide 10. A retaining screw or fastener can thereafter be placed into tapped hole 126 (FIG. 3) to keep the retainer 350 and cable 14 in place. It should be appreciated that this places rack teeth extending downwardly and intersecting with diametrical portion 110.

Motor 8 is now mounted to flange 6 by positioning motor shaft 166 and gear teeth 168 through flange opening 66 and by aligning apertures 164 of flange 162 (FIG. 10) with apertures 62 (FIG. 2). Shaft 16 is now mounted in aperture 116 by way of a threaded fastener into tapped hole 176 (FIG. 11). Clutch plate 20 can now be positioned over shaft 16, such that opening 206 (FIG. 3) is positioned over diametrical portion 172 (FIG. 11). This also allows teeth 192 to mesh with teeth 150 on rack member 12. This also allows, when clutch plate is pushed fully forward and radially aligned, that radial ribs 130 engage within respective recesses 196. The thrush washers 22, sandwiching thrust needle bearing 24, can now be positioned over shaft 16 and received in diametrical recess 204 (FIG. 13). Finally, thrush washer 25 is slidably received over shaft 16 and abuts with shoulder 180 (FIG. 11) of shaft 16.

The assembly of the rotor subassembly can now be completed, where magnet wire is wound on bobbin 26, wherein a start lead is held exposed from the bobbin and a plurality of turns are made exposing another end of the lead. Ring gear 26 is now positioned over hub 220 into an interfering fit therewith. It should be appreciated that the apertures 244 and 256 of the rotor and ring gear are aligned. Bobbin 26 may now be positioned over hub 232 of rotor 220, with the two leads extending through apertures 244 and 256. This places the leads onto the outer surface of bands 254. The slip rings 220 may now be positioned over the bands 254 such that the magnet wire is welded to, soldered to, or is in some way electrically interconnected with the magnet wire. As mentioned before, the ring gear 26 is formed of an insulating material, whereas the slip rings 224 are comprised of a copper alloy, and therefore the slip rings are interconnected to opposite ends of the wire.

Figure 28:
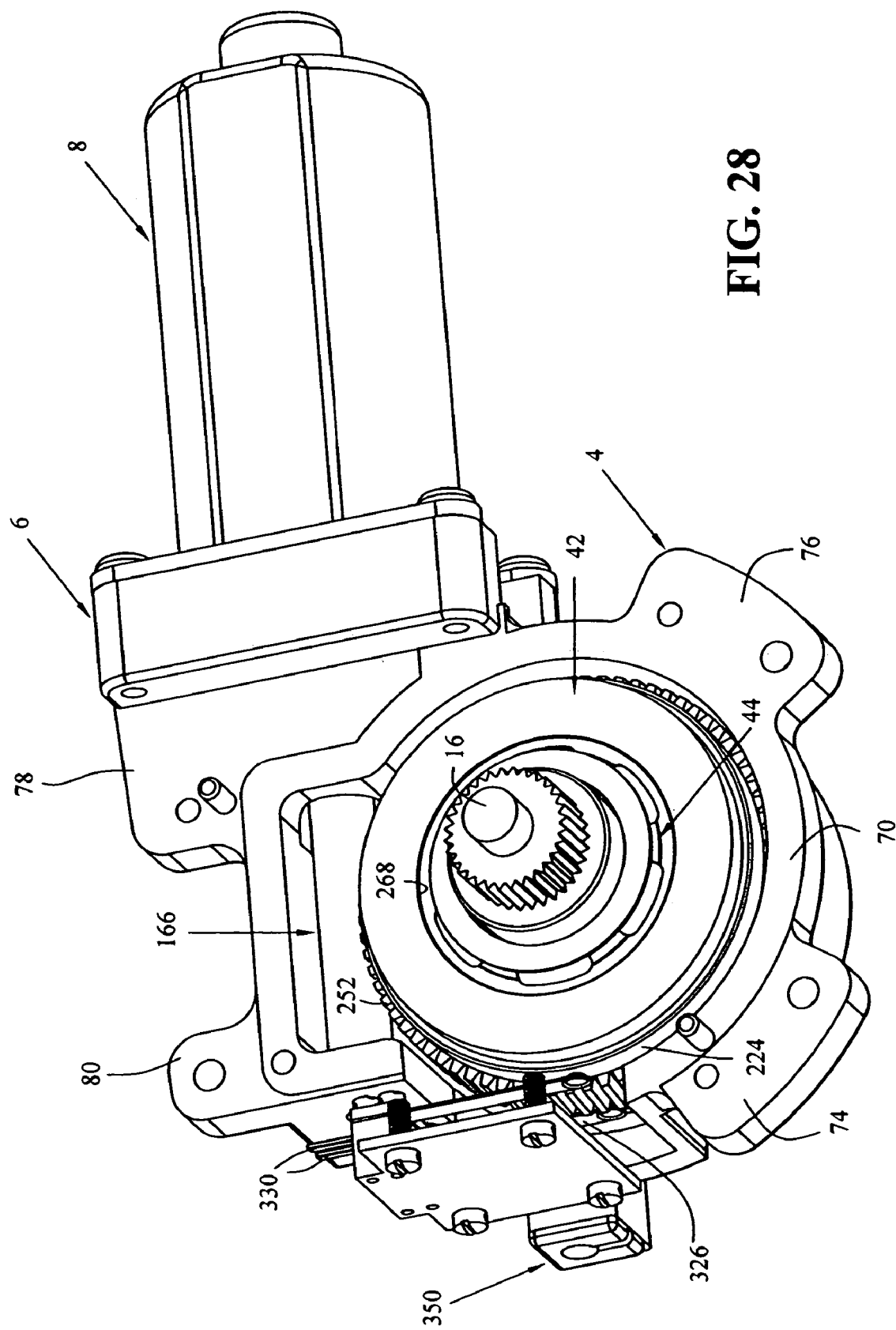
FIG. 28 is a perspective view of the dual actuator in a partially assembled view less the end cover.
Figure 29:
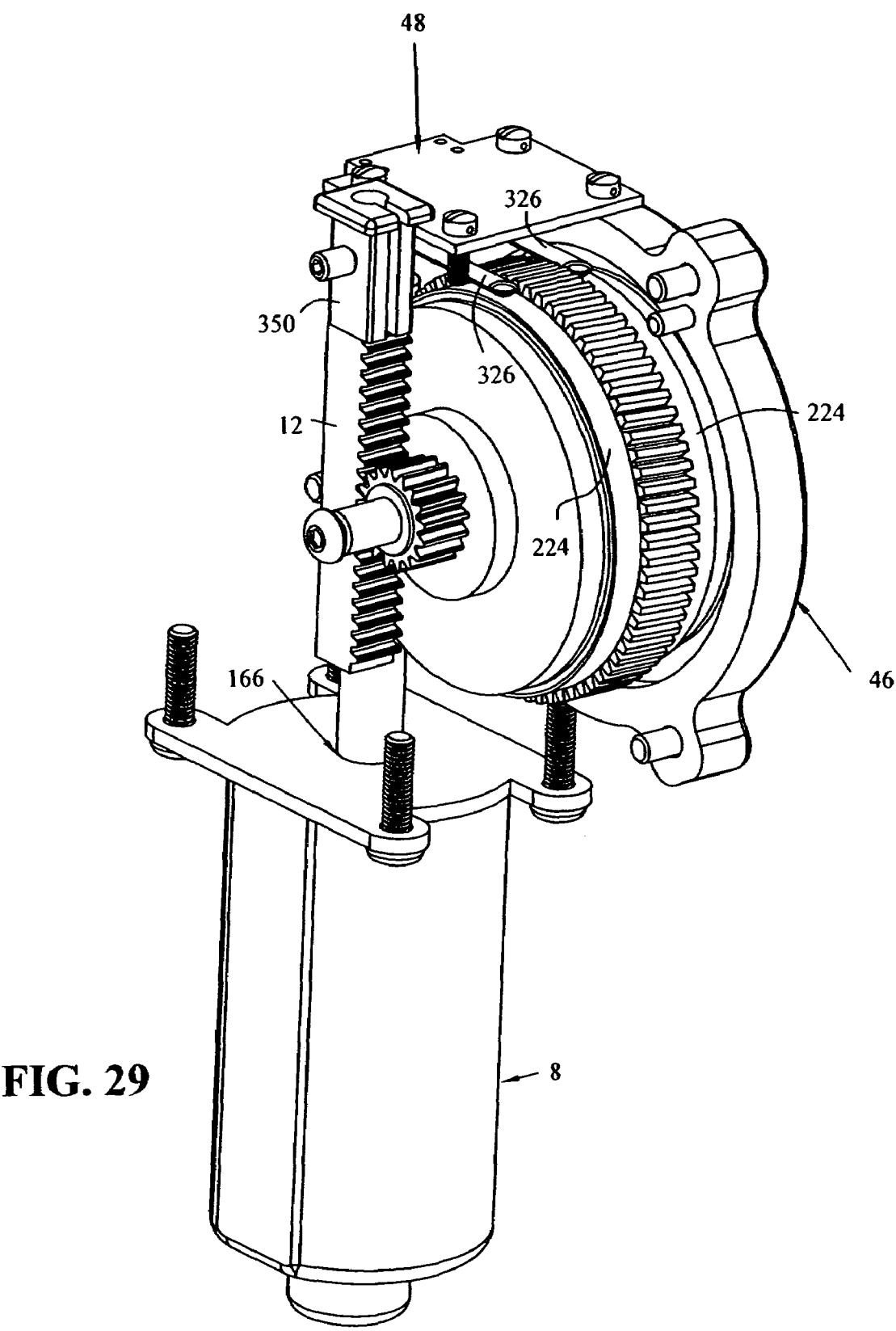
FIG. 29 is a perspective view of the assembly less the main housing portion.

This assembly, that is, rotor assembly 30, together with bobbin 26, may now be slidably received over shaft 16 with the bobbin end in first. The thrust rods are now positioned in apertures 238 (FIG. 15) until the thrust rods abut outer thrust washer 22 (FIG. 1). A thrust washer 34 is now slidably received over the diametrical portion 178 (FIG. 11) of shaft 16, and a snap ring 36 is positioned in groove 182. Thrust washers 38 are now positioned on opposite sides of another thrust needle bearing 40 and are slidably received over shaft 16. The outer clutch plate 42 is now slidably received over shaft 16 until it abuts rotor assembly 30. Return spring 44 is now positioned adjacent to clutch plate 42, with outer flange 280 (FIG. 21) residing in recessed portion 268 (FIG. 18). The assembly to this point is shown in FIG. 28. Cover 46 is now positioned adjacent to spring 44 and with corresponding mounting ears 292 positioned adjacent to mounting ears 78, and with mounting ears 294, 296 adjacent to mounting ears 76, 74, respectively (FIGS. 2 and 22). It should also be appreciated that dowl pins can be positioned in corresponding aligning apertures, that is, apertures 300, 86, in each of the mounting ears 74, 78, 292, 296, to align the housing 4 and cover 46 together.

Figure 30:
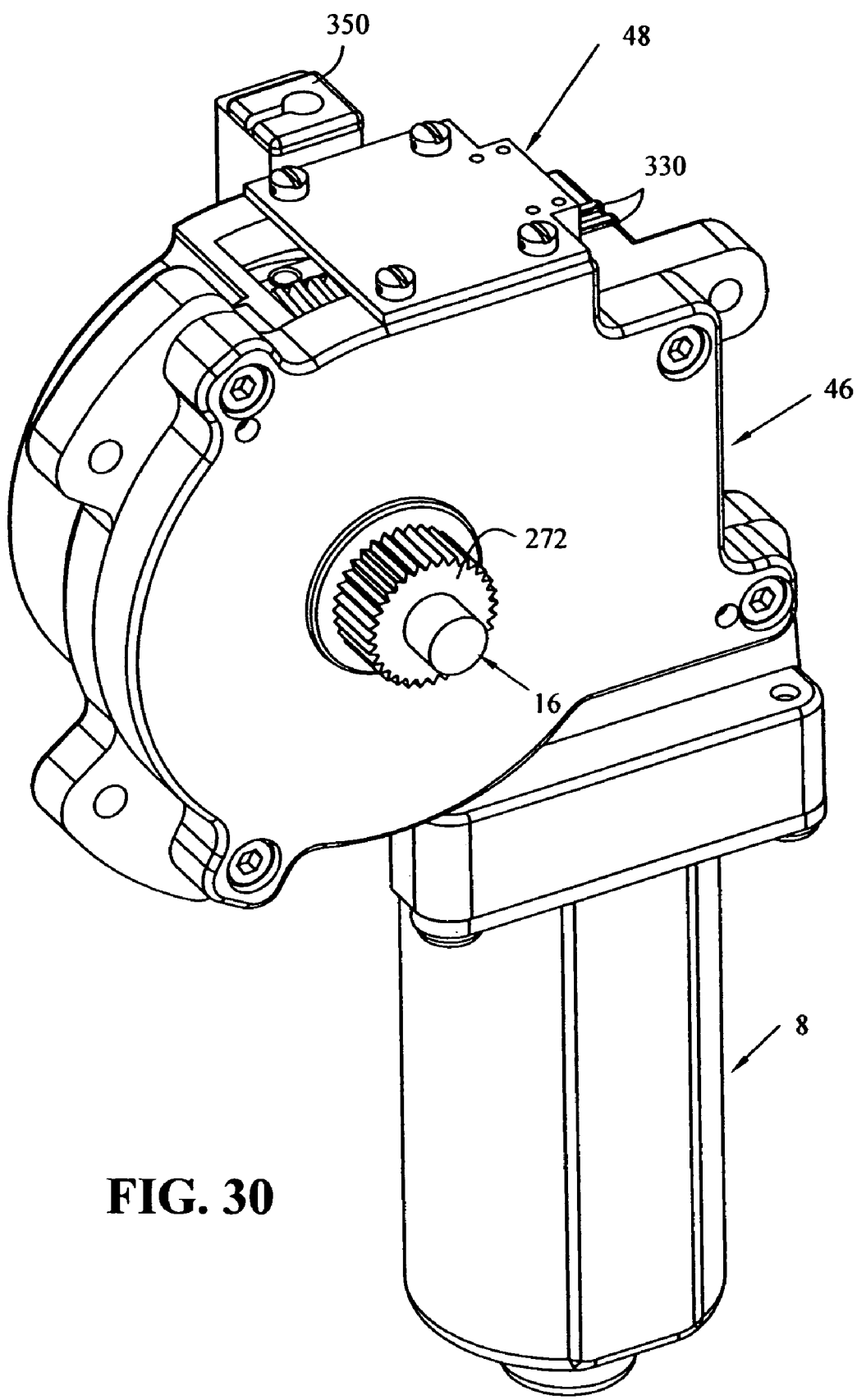
FIG. 30 is a perspective view similar to that of FIG. 28, showing full assembly.

The assembly is completed by placing the brush assembly 48 over opening 90, such that openings 344 are aligned with openings 100, and openings 346 are aligned with openings 311 (FIG. 1). The completed assembly is shown in FIGS. 30–32.

Figure 33A:
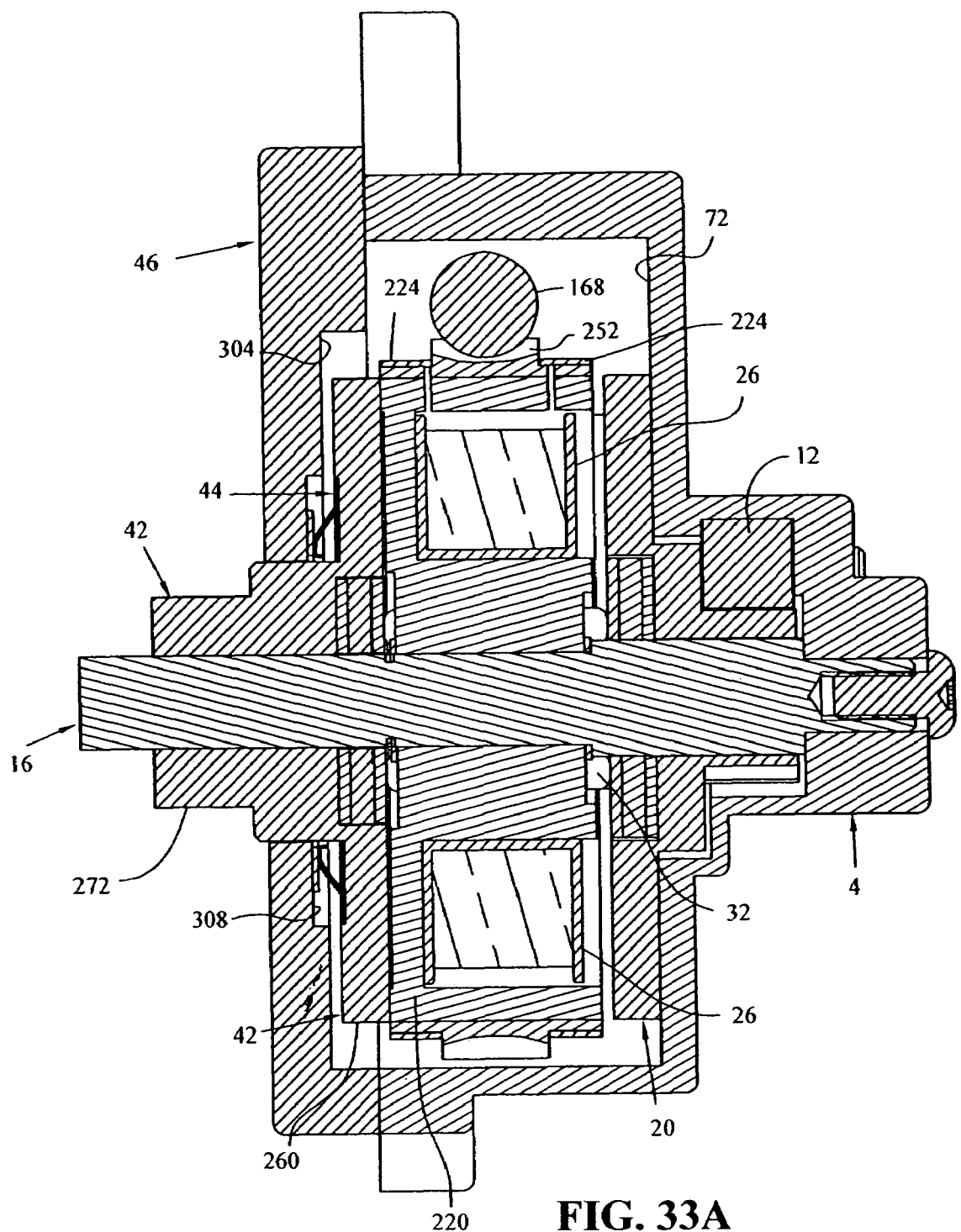
FIG. 33A shows a cross-sectional view through lines 33—33 of FIG. 31.
Figure 33B:
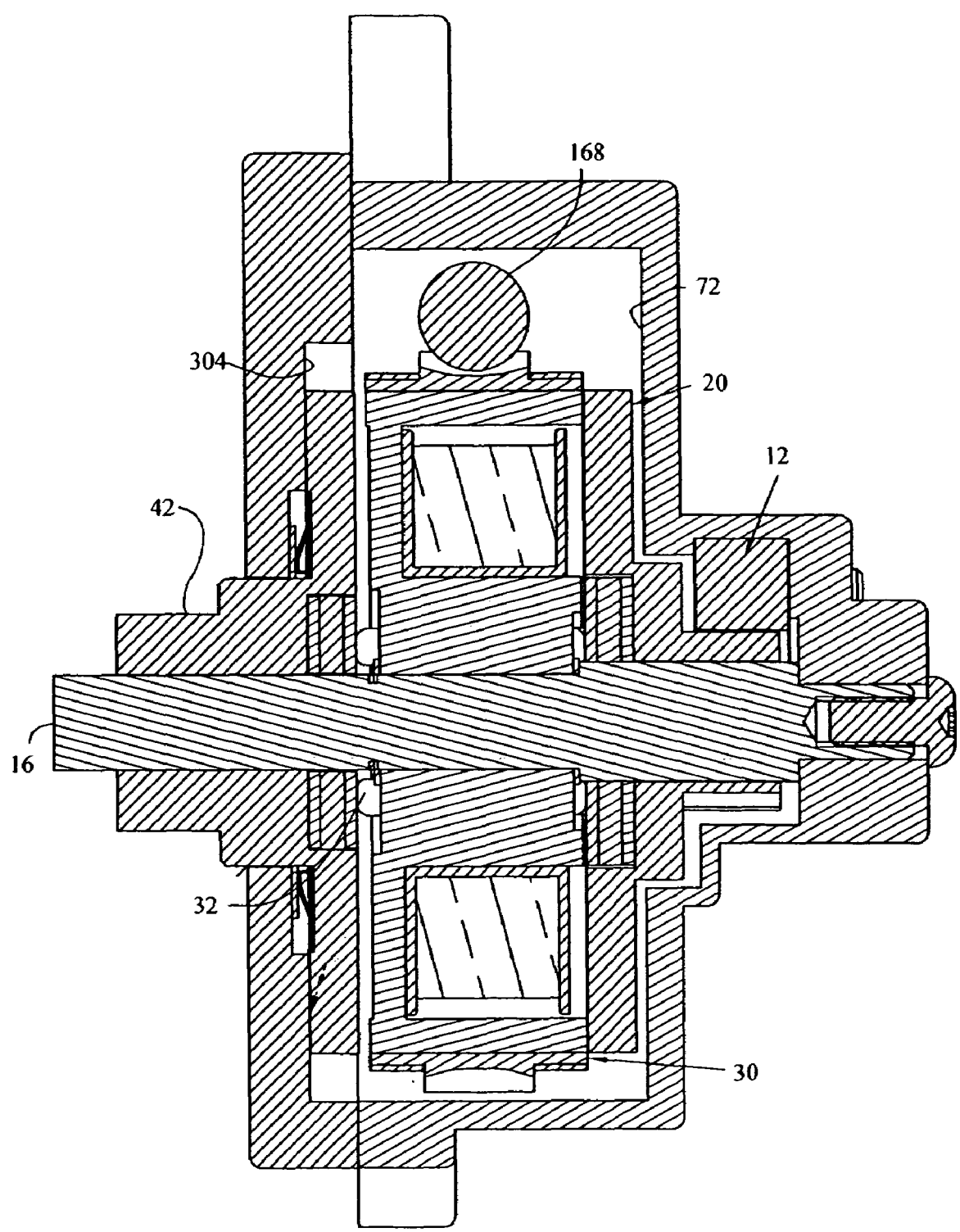
FIG. 33B shows a cross-sectional view similar to that of FIG. 33A, showing the other phase of actuation.
Figure 34:
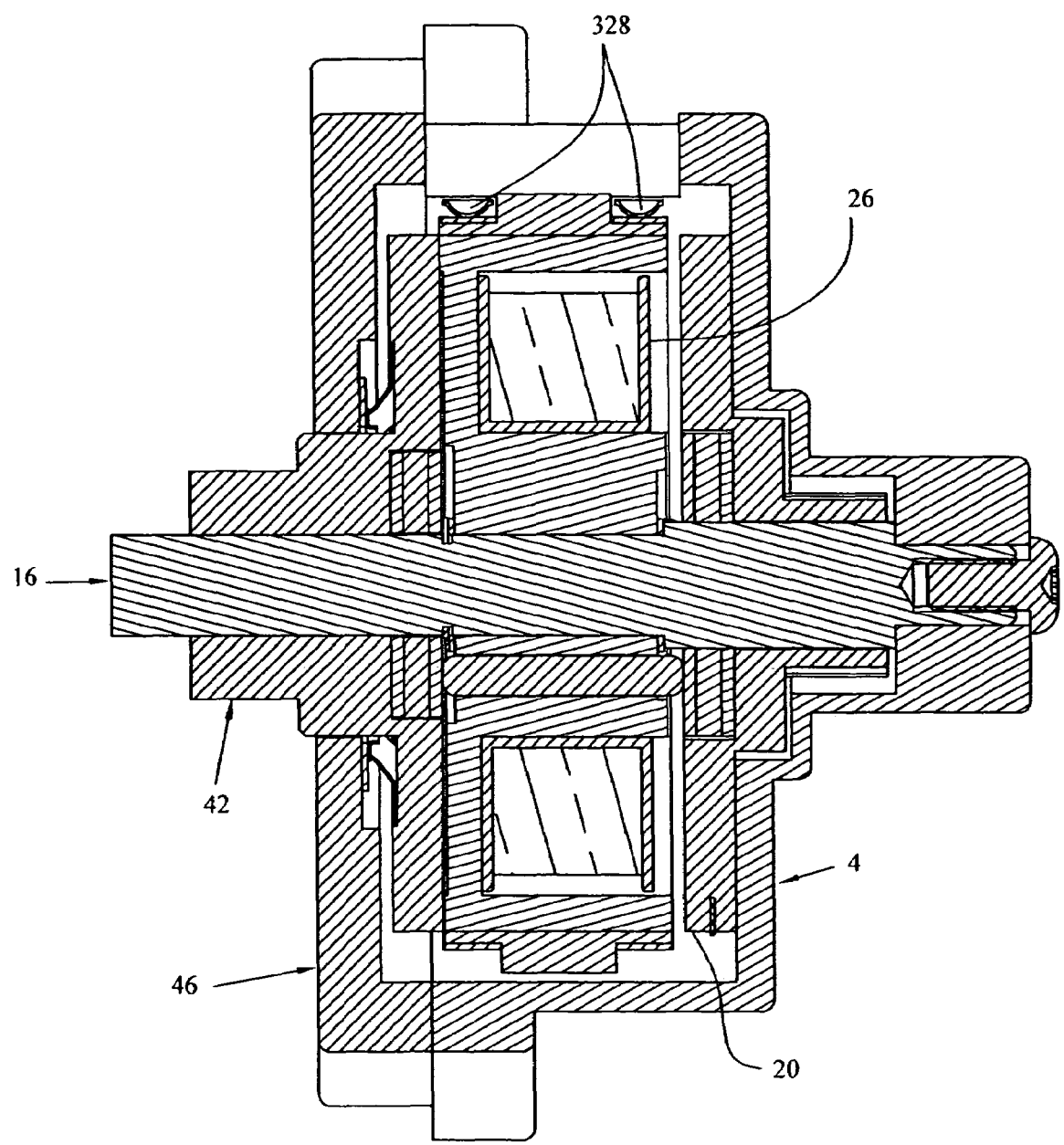
FIG. 34 is a cross-sectional view through lines 34—34 of FIG. 31.

With the device as described above, the operation will now be described relative to FIGS. 33A, 33B and 34. As shown in FIG. 33A, rotor member 220 will be locked in the axial position relative to shaft 16. That is, rotor 220 does not laterally move to the left or right as viewed in FIG. 33A. It is locked on one side by thrust washer 25 (FIG. 1) and on the opposite side by thrust washer 34 (FIG. 1). However, clutch plates 20 and 42 move laterally relative to shaft 16, as described below.

As shown in FIG. 33A, the electromagnet formed by bobbin 26 is not operational, and therefore spring 44 is fully sprung to its right, forcing clutch plate 42 away from cover 46. This causes thrust washers 38 (FIG. 1) to push on push rods 32 and thereafter onto thrust washers 22 (FIG. 1), thereafter pushing clutch plate 20 into wall 72. This causes the inter-engagement of radial ribs 130 (FIG. 2) with recesses 196. Thus, clutch plate 20 is locked in place, while clutch plate 42 is frictionally held against rotor 220 by spring 44. Thus, when motor shaft 166 and gear teeth 168 rotate, thereby causing rotor 220 to revolve around shaft 16, it carries with it clutch plate 42, thereby turning gear teeth 272. Thus, gear teeth 272 are one phase of the dual phase actuator, and can operate any member operable by way of connection to gear teeth 272.

When the alternate phase is desired, that is, when the feature connected to the bowden cable 14 is desired, the magnet is actuated, by supplying power to contacts 330 (FIG. 28). This supplies a current through contacts 326, slip rings 224 and thereafter to the magnet wire, which is wound around bobbin 26. The flow of current is such as to create a magnetic field forcing clutch plate 20 from the position shown in FIG. 33A leftward to the position shown in FIG. 33B, where a gap exists between clutch plate 20 and inner surface 72. This releases the previous inter-engagement of ribs 130 and recesses 196, and at the same time, causes push rods 32 to move leftwardly, engaging thrust washers 38 (FIG. 1) and causing the engagement of clutch 42 with inner wall 304 and the inter-engagement of ribs 312 (FIG. 22) and recesses 266 (FIG. 18). Thus, clutch plate 42 is locked in place from rotating about shaft 16, whereas clutch plate 20 is released from engagement with surface 72, and is attached to rotor 30 through the electromagnetic connection. Thus, actuation of the motor and gear teeth 168 causes a rotation of rotor assembly 30 and clutch 20, which in turn drives linear rack 12 and bowden cable 372.

While the invention disclosed herein shows rotary and linear outputs, it should be apparent that two rotary outputs, or two linear outputs could also be easily provided. For example, if two rotary outputs are required, then the output directly from clutch plate 20 could be used. Also, if two linear outputs are desired, then a second rack assembly could be provided at the second clutch plate 42.

Figure 35:
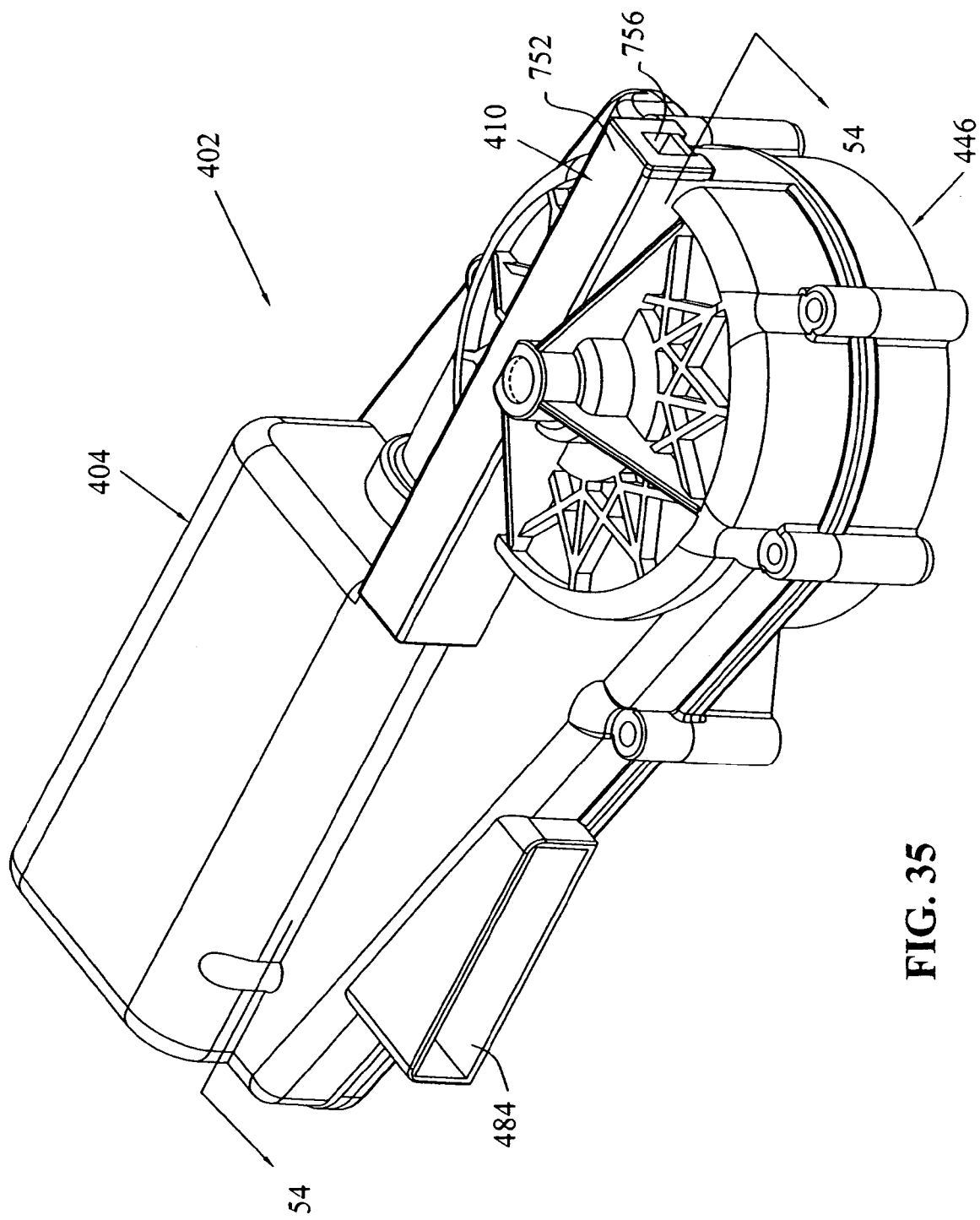
FIG. 35 shows a top perspective view of another embodiment of the invention.
Figure 51:
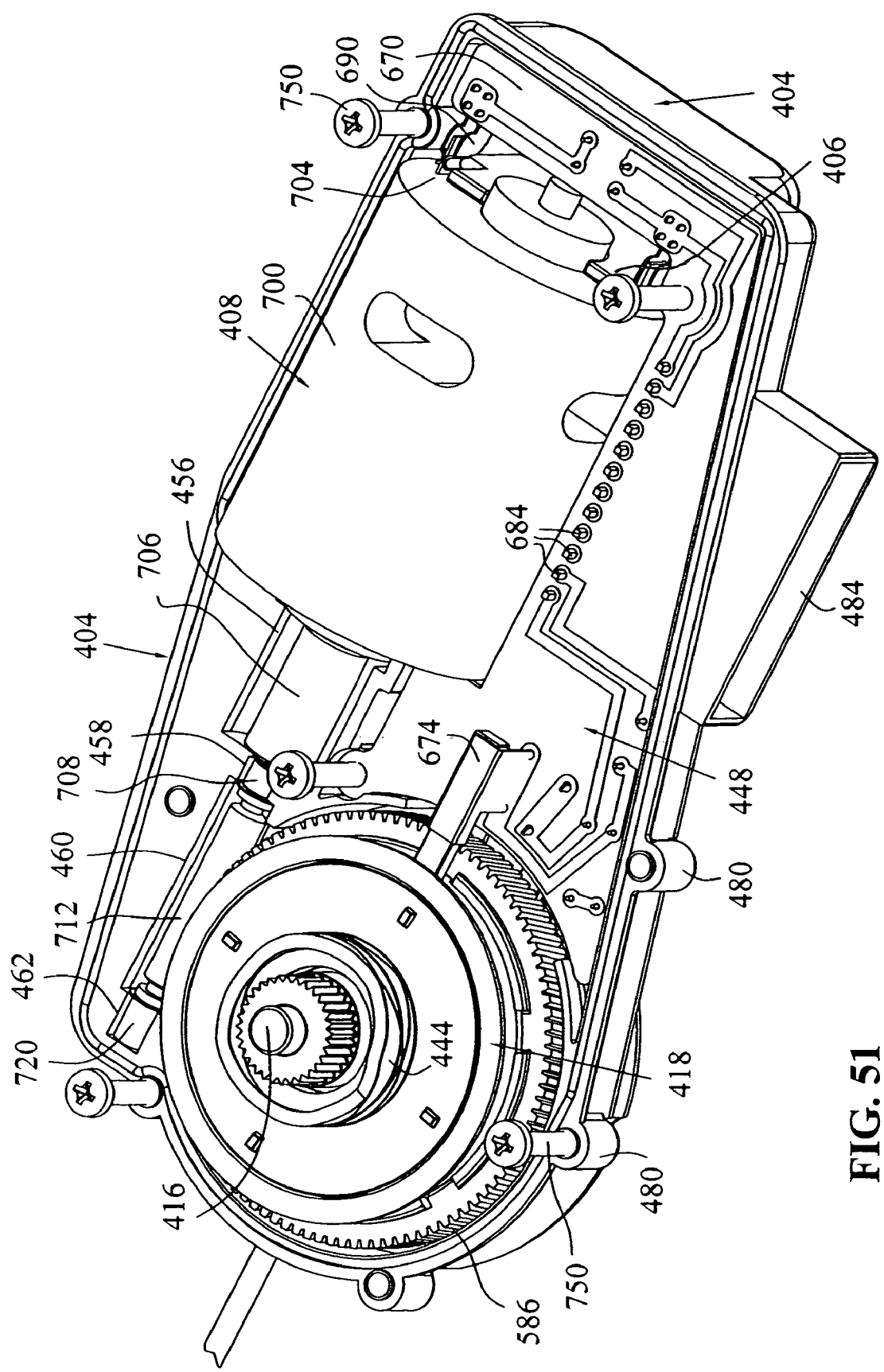
FIG. 51 shows the motor, control board and clutch assembly installed in the housing member, with the cover portion removed.
Figure 52:
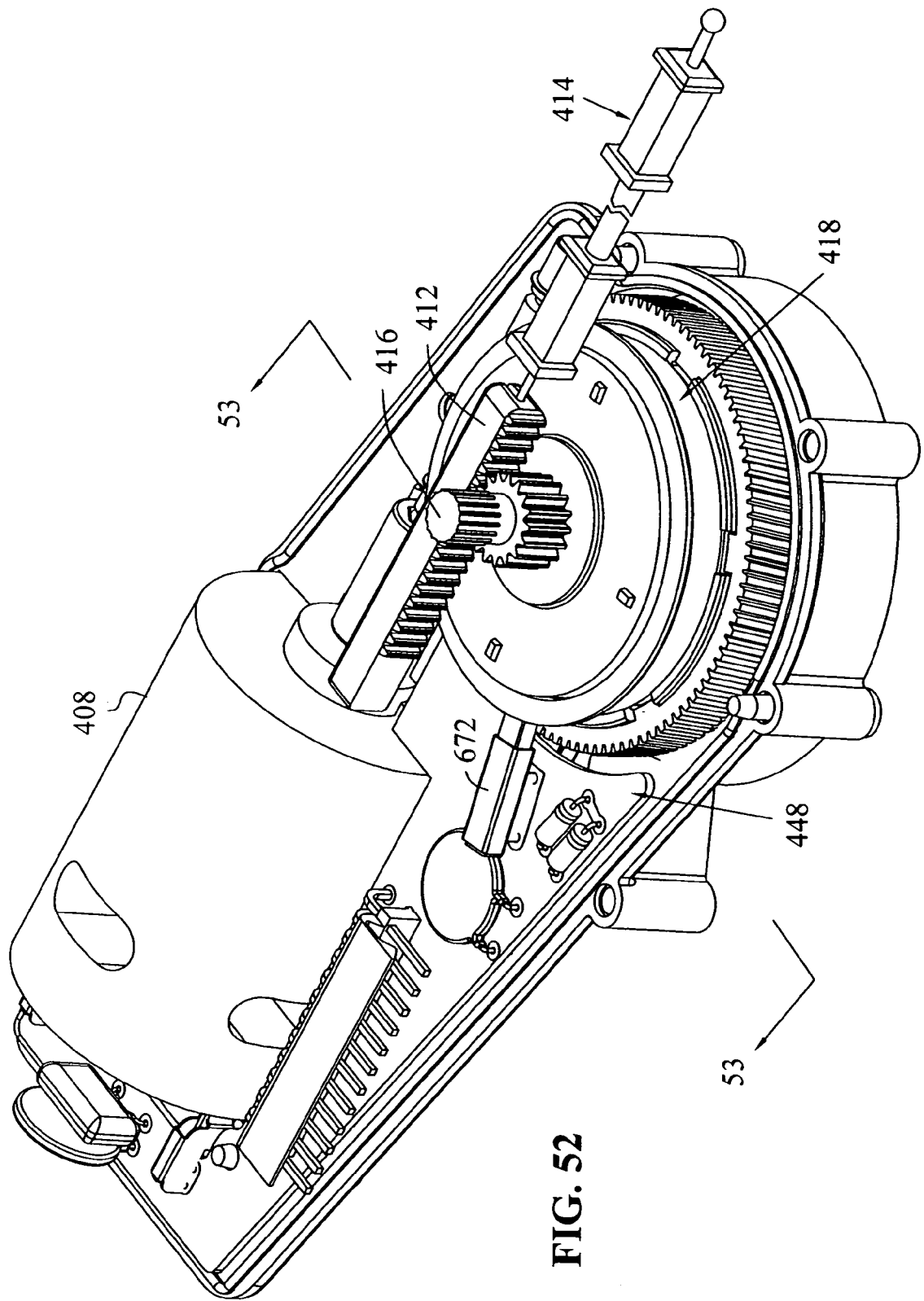
FIG. 52 shows the housing control board and clutch assembly installed in the cover portion with the housing portion removed.

With respect now to FIGS. 35 through 54, another embodiment of the invention will be described. As best shown in FIG. 35, a dual actuator is shown generally at 402 having a main housing portion 404. As shown in FIG. 51, main housing portion 404 includes a motor mounting section 406 to mount a motor 408. As shown in FIG. 35, cover 404 includes an integrated slide portion 410 profiled to receive a rack 412 (FIG. 52), which moves bowden cable 414. As shown in FIG. 51, a shaft 416 receives an electromagnetic clutch assembly 418 for rotation thereon.

Figure 41:
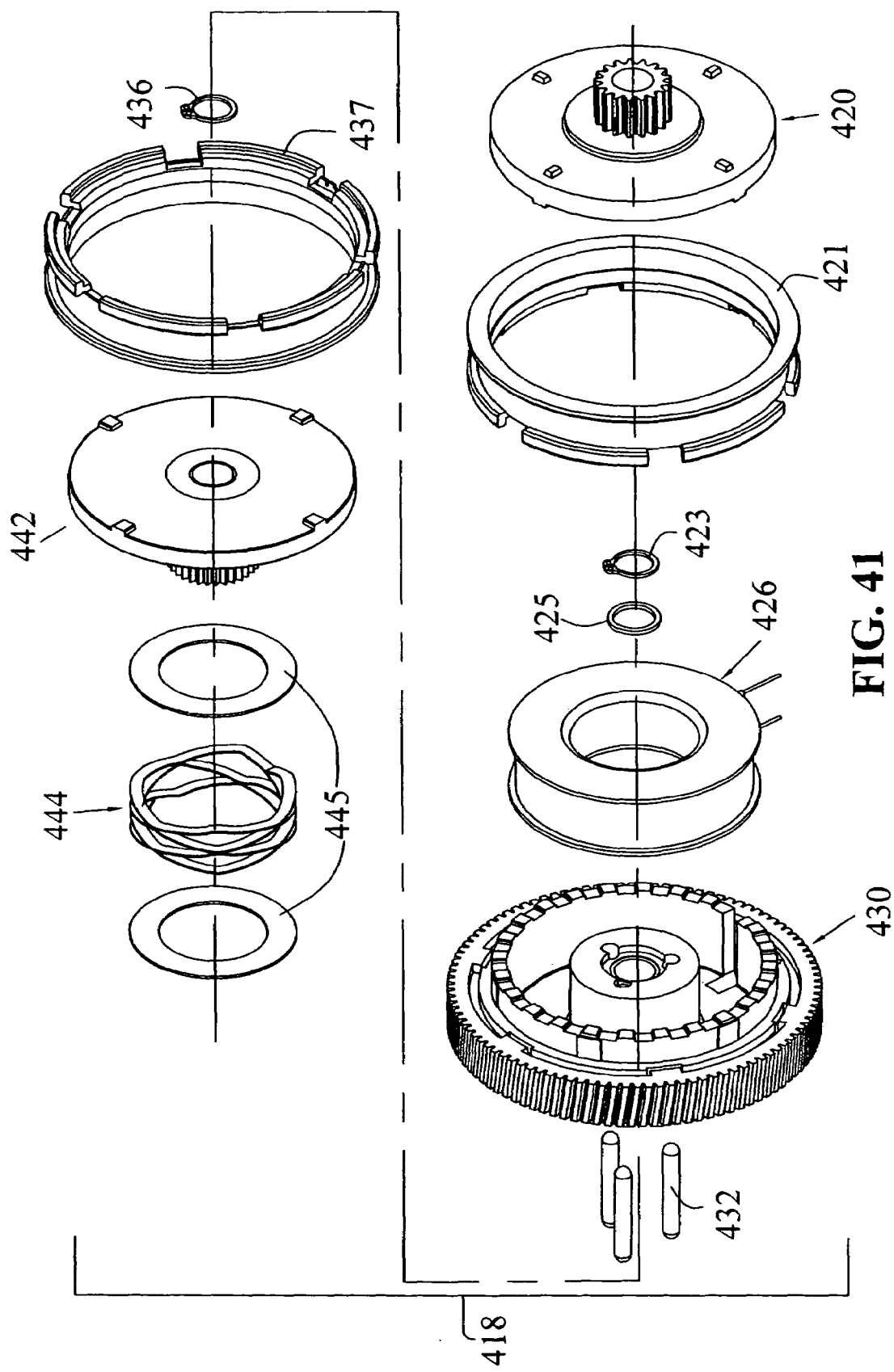
FIG. 41 shows an exploded view of the electromagnetic clutch assembly of the present embodiment.

With reference now to FIG. 41 electromagnetic clutch assembly 418 includes first clutch plate 420, contact ring 421, snap ring 423, washer 425, bobbin 426, rotor assembly 430, thrust rods 432, snap ring 436, contact ring 437, second clutch plate 442, thrust or compression spring 444, and thrust washers 445. With reference again to FIG. 35, cover portion 446 encloses the assembly to provide an enclosed motorized dual actuator, dual clutch assembly, whereby alternative linear or rotary motion can be provided. Finally, and with reference again to FIG. 51, the assembly generally includes a control circuit board at 448, as will be described herein. With the general elements of the second embodiment now described, the details of the components will now be described.

Figure 36:
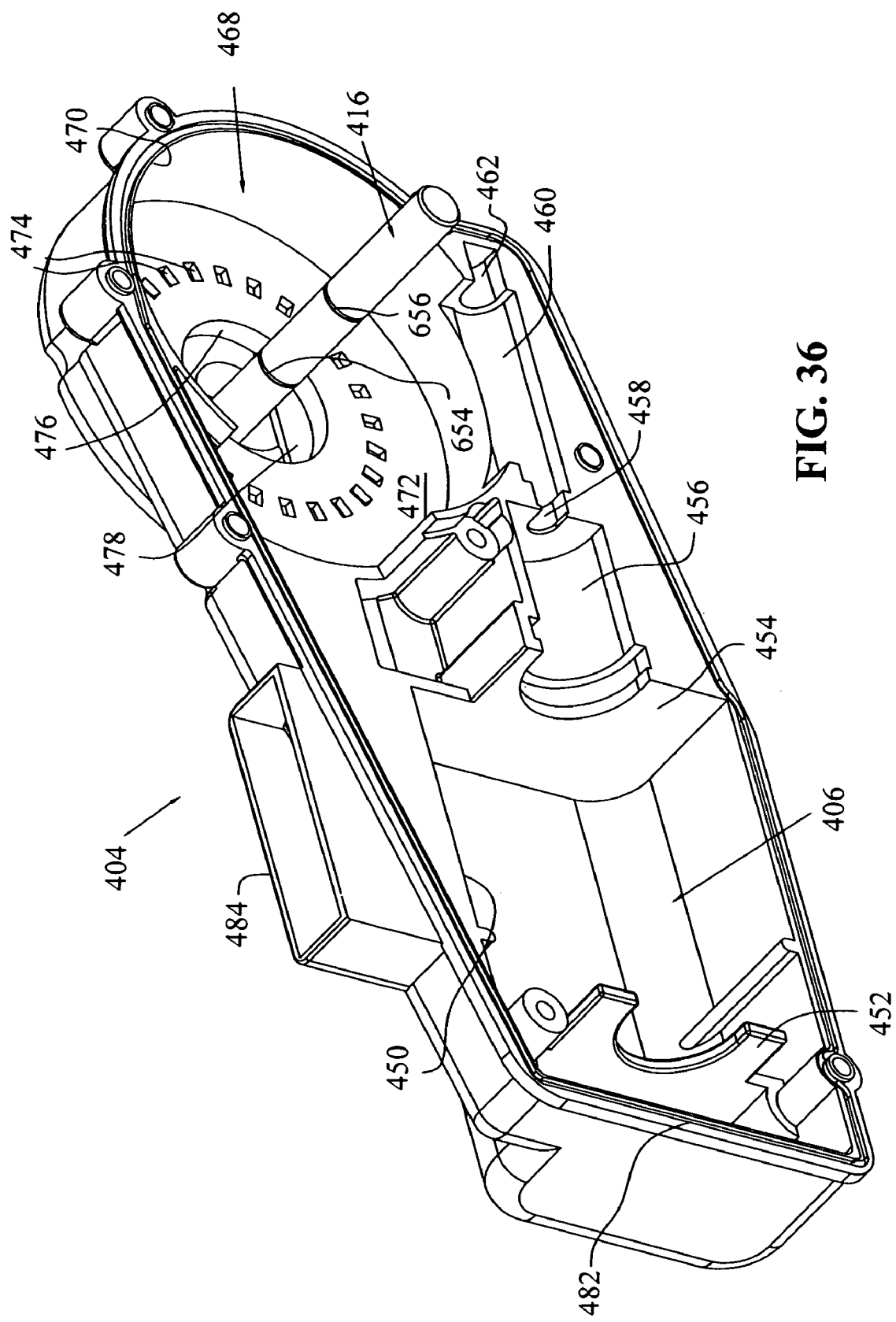
FIG. 36 shows an inside perspective view of the housing portion of the embodiment shown in FIG. 35.
Figure 37:
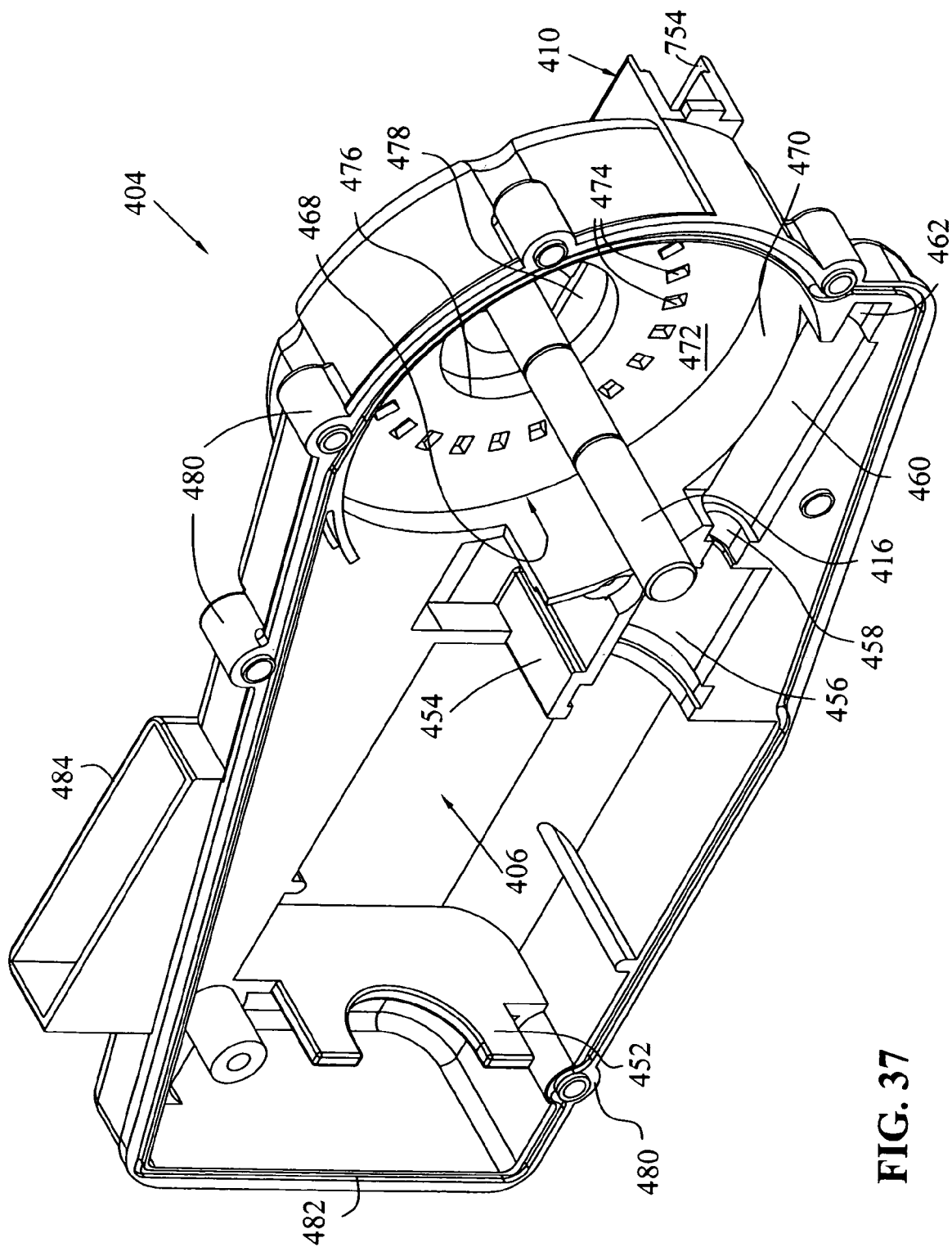
FIG. 37 shows another perspective view of the housing portion of FIG. 36.

With reference first to FIGS. 36 and 37, main housing 404 is shown, where motor mounting section 406 is generally defined by an enlarged volume portion at 450, flanked by bearing wall portions 452, 454. A coupling receiving section 456 is also provided, which is continuous with a bearing wall 458, a worm gear receiving section 460, and a bearing receiving section 462.

With reference still to FIGS. 36 and 37, main housing portion 404 includes a cavity portion 468 profiled to receive the clutch assembly 418. As shown, shaft 416 is centrally located relative to the cavity 468, and is integrally molded into the main housing portion. That is, in this embodiment, shaft 416 is comprised of a metal shaft, preferably a steel alloy, where the shaft end is integrally molded into a plastic housing. As shown, cavity 468 is defined by an outer diameter portion 470 and an inner face 472, having a plurality of radially spaced apertures 474, radially spaced about the center of shaft 416. Housing 404 further includes an inner radius portion 476 and an opening portion, which communicates into the rack slide 410, in a similar manner as described with the embodiment of FIGS. 1 through 34. Main housing portion 404 further includes a plurality of mounting bosses 480 and an outer peripheral edge 482 profiled to receive a peripheral gasket. Main housing portion 404 includes a port 484, which communicates with the inner cavity 406 for control of the motor and clutch, as will be described herein. Finally, with respect to FIG. 38, the main housing portion 404 is shown from the exterior side, where a central hub portion 486 is shown, which would be overmolded about the end of shaft 416.

Figure 39:
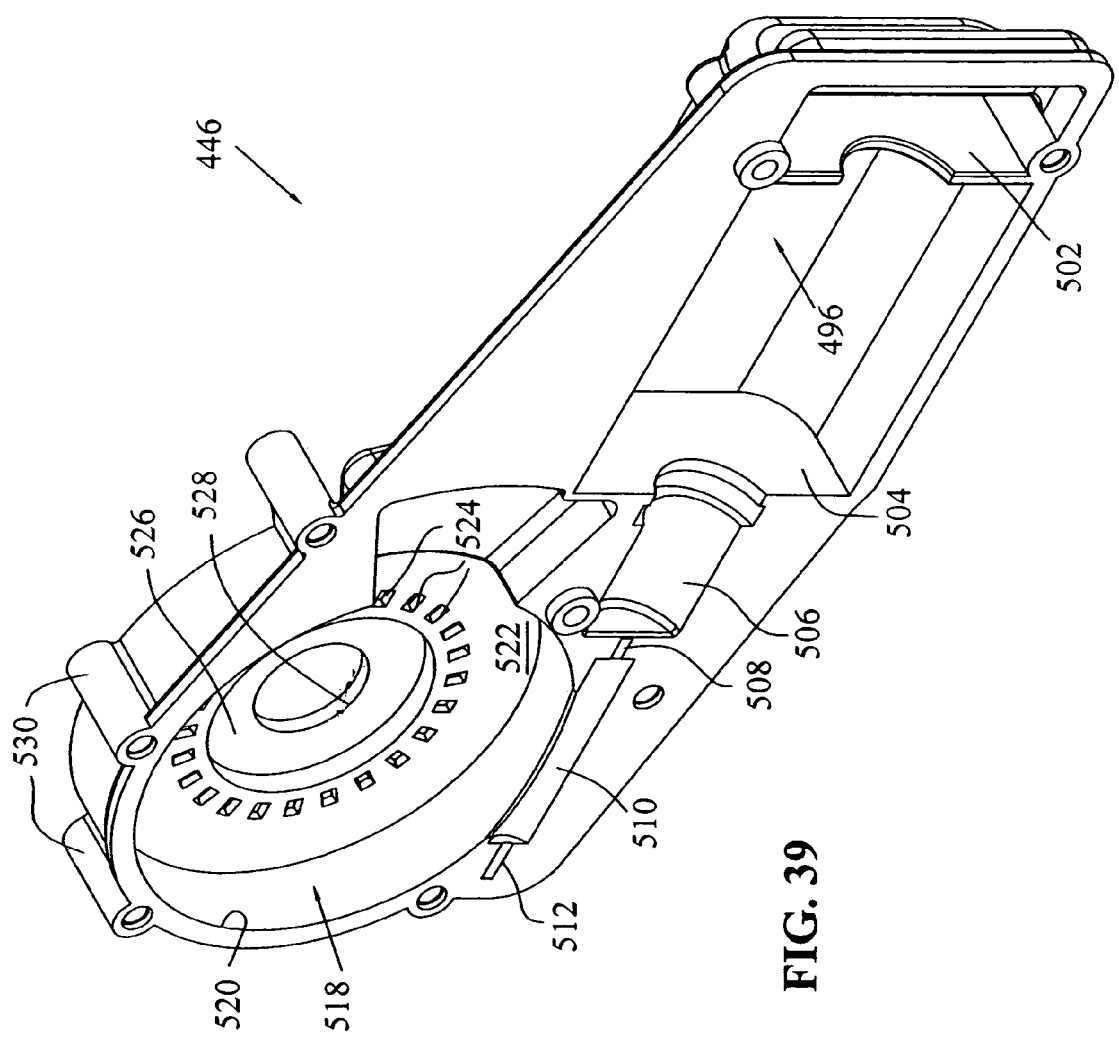
FIG. 39 shows an inside perspective view of the cover portion for the embodiment shown in FIG. 35.

With respect now to FIG. 39, cover portion 446 is shown having a cavity portion 496 complementary with the cavity portion 406 in the main housing portion 404 (FIG. 6) and complementary bearing wall portions 502, 504, coupling receiving section 506, bearing receiving section 508, gear receiving section 510, and bearing receiving section 512. A clutch receiving cavity is formed at 518 having an inner diameter 520 and an internal face 522. Face 522 includes a plurality of radially spaced apertures 524. A radial face 526 is defined about an aperture 528. Cover portion 446 is shown from the exterior in FIG. 40, where bosses 530 are shown, which are complementary with bosses 480 (FIG. 37) on main housing portion 404.

Figure 42:
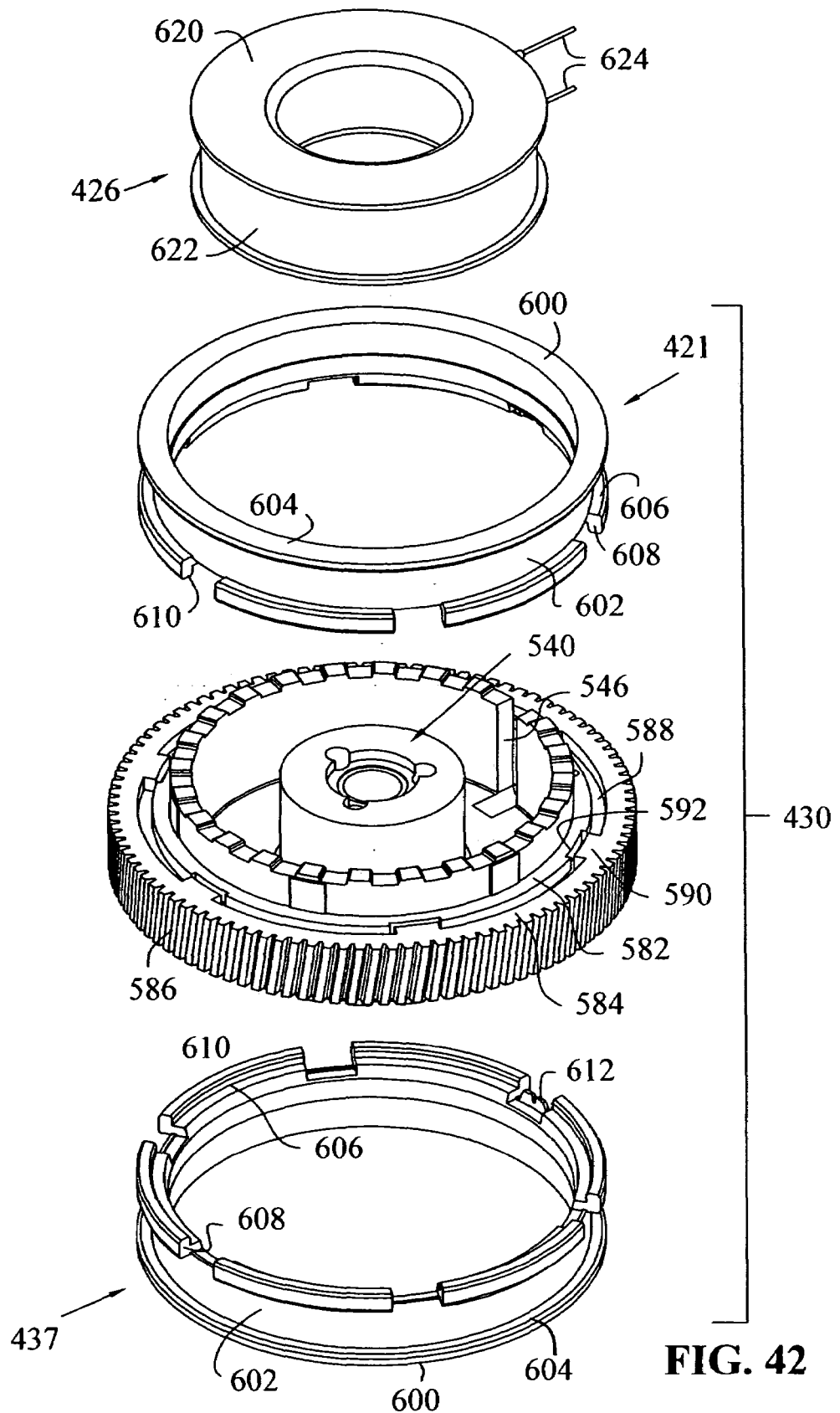
FIG. 42 shows an exploded view of a portion of the assembly of FIG. 41.
Figures 45, 46:
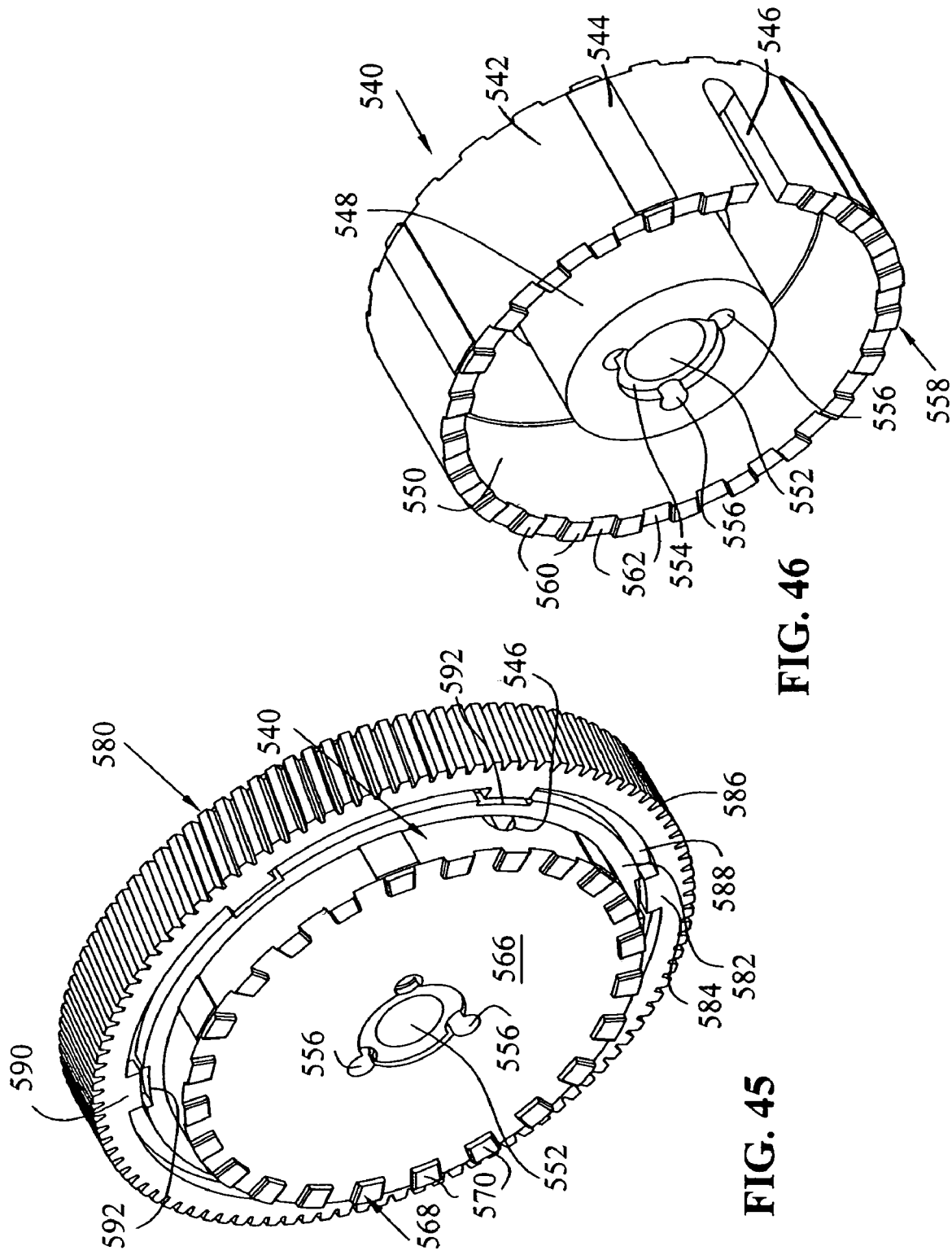
FIG. 45 shows an enlarged perspective view of the rotor and ring gear of the clutch assembly shown in FIG. 41.
FIG. 46 shows an enlarged view of the rotor member shown from the opposite side as that of FIG. 45, and with the ring gear removed.

With reference now to FIGS. 42, 45 and 46, rotor assembly 430 will be described in greater detail. As shown first in FIG. 46, rotor assembly 430 includes a central rotor portion 540 having an outer diameter portion 542 having raised portions at 544, and a slotted portion 546 extending therethrough. A central hub portion 548 extends upwardly defining a toroidal volume at 550. Central hub portion 548 also includes a central bore 552 having a recess 554 and three apertures 556 surrounding the bore 552. As shown in FIG. 45, bore 552 extends through the entire rotor portion, and as should be appreciated, is profiled to be rotatably received on shaft 416. As best shown in FIG. 46, rotor portion 540 also includes an outwardly extending edge having interlocking members 558, defined by intermittent raised portions 560 and groove portions 562. As shown best in FIG. 45, rotor 540 also includes an outer face at 566 also having interlocking portions 568 defined by raised portions 570 extending upwardly from face 566. Finally, it should be understood that rotor 540 is comprised of a ferromagnetic material, such as an iron ore composition.

As shown in FIG. 45, an outer ring gear is shown at 580 attached to the outer diameter portion 542 of rotor 540. In the embodiment shown, ring gear 580 is comprised of plastic, and is integrally molded to the outer diameter 542 of rotor 540 and encapsulates portions 544 in order to be fixed thereon. As shown in both FIGS. 42 and 45, ring gear 580 includes an inner portion 582 and an outer portion 584, where the outer portion 582 includes the ring gear teeth 586. Intermediate the inner and outer portions, annular slots 588 are defined interrupted by ribs 590 and slots 592, as will be described in greater detail.

With respect now to FIG. 42, the contact ring assemblies 421 and 437 will be described, and in this embodiment, are substantially identical. As shown, each of the rings includes an outer molded ring portion 600 having an inner contact ring at 602. The contact ring 602 is formed of a conductive material, and is trapped by outer flange portions 604, 606. The outer flange portion 606 is interrupted by radial slotted portions 608, and includes a peripheral upstanding lip 610. As best shown in relation to contact ring assembly 437, the inner contact ring 602 includes a contact portion 612 extending through the slotted portion 608, and as appreciated by one skilled in the art, would be profiled to receive a terminating end of a magnet wire, as described further herein. It should also be appreciated that the slotted openings 608 are radially disposed in the same pattern as members 590 (FIG. 45) and therefore contact ring assemblies 421 and 437 can be received within their associated slots 588, with the lip 610 snapping into a locked engagement with the outer ring gear 580.

With reference still to FIG. 42, magnet wire assembly 426 includes a bobbin housing 620, magnet wire windings 622 having opposite terminating ends at 624.

With reference now to FIGS. 43 and 44, the first and second clutch plates 420 and 442 will be described. With reference first to FIG. 44, clutch plate 420 includes a face portion 630 having outward projections 632 extending therefrom. Clutch plate 420 also includes a centrally located pinion 634 having a throughbore at 635, where the throughbore is profiled to be received over shaft 416, and pinion is profiled to be received into the portion 478 communicating with the rack slide 410. Clutch plate 420 further includes a rear face 636 having projections at 638. It should be appreciated that clutch plate 420 is profiled such that face 630 can be positioned adjacent to face 472 (FIG. 36) and such that projections 632 can be received in apertures 474. It should be further appreciated that rear face 636 can be positioned adjacent to hub 548 of rotor 540 and that projections 638 can be engaged with the interlocking portions 558, that is, projections 638 can be received in the recesses 562 (FIG. 46).

In a like manner, clutch plate 442 includes a front face 640 having projections 642 extending therefrom. Drive gear 644 extends from the front face and has a throughbore at 645. Clutch 442 has a rear face 646 with projections 648. It should also be appreciated that clutch plate 442 is profiled to be received in cavity 518 (FIG. 39) with surface 640 being position able adjacent to face 522, with projections 642 being position able in apertures 524. It should also be appreciated that this positions drive gear 644 projecting through opening 528 and cover member 446. Finally, projections 648 are profiled to be interlockable with interlocking members 568, intermediate projections 570 (FIG. 45).

With respect now to FIG. 47, shaft 416 includes an outer end 650, and a splined end 652, which is profiled for integrally molding in the main housing portion 404, as described above. Shaft 416 further includes first and second peripheral grooves 654 and 656.

With respect to FIG. 48, thrust washer 444 is shown. Thrust washer 444 is comprised of a unitary spring steel member profiled with projecting portions so as to define contact points at 660, thereby defining a compression spring.

Figure 49:
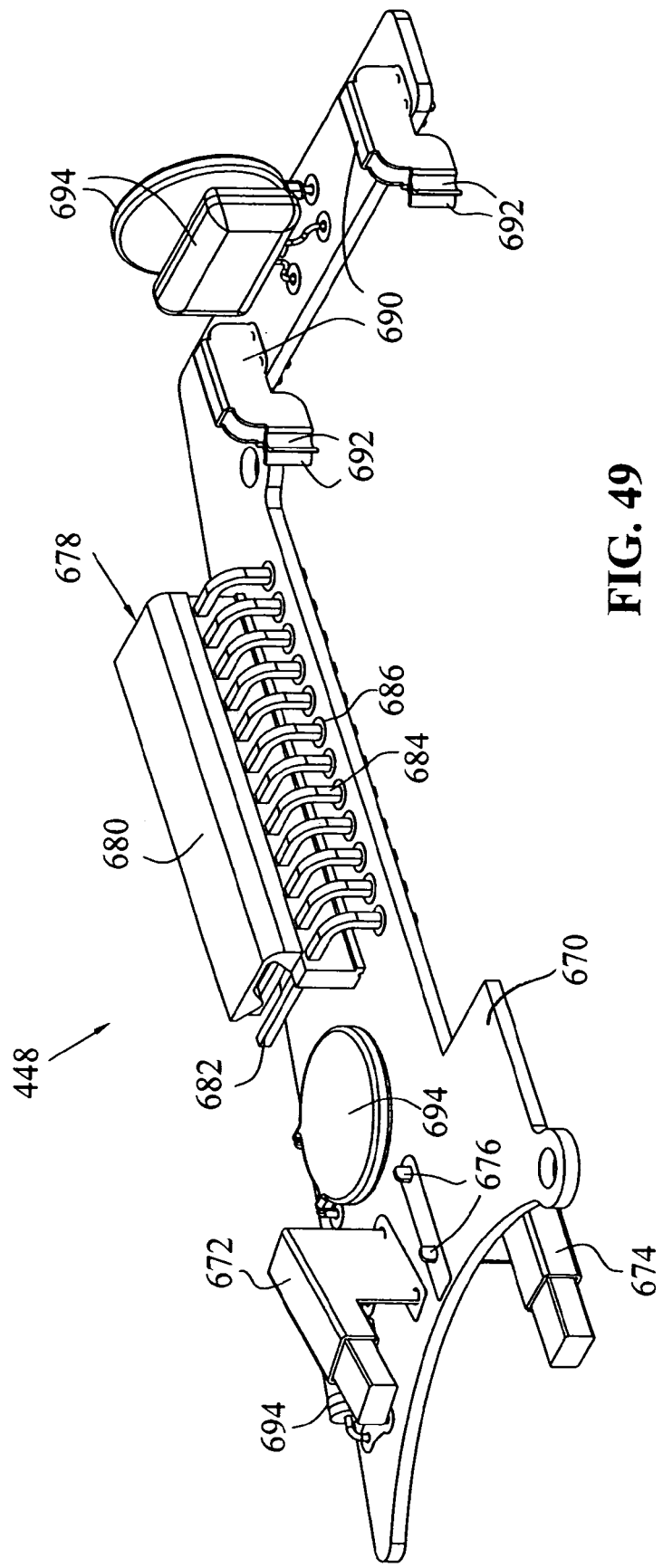
FIG. 49 shows an enlarged view of a control board.

With respect to FIG. 49, control board 448 is shown as including a printed circuit board 670 having brushes 672 and 674 mounted thereon, and electrically connected thereto, for example, by way of terminals 676. An electrical connector 678 is mounted to the printed circuit board 670 and includes a housing portion 680 having pin terminals at 682 and printed circuit board contact portions 684 interconnected to throughholes 686 on the printed circuit board 670. Electrical terminals 690 are also electrically mounted to printed circuit board 670 and include opposing blade-style contacts 692. Control board 448 can also be provided with electrical components generally shown at 694 to define any desired functions, such as an over current protection. While not specifically shown, it should be appreciated that the various components are interconnected to the electrical connector, for example, by electrical traces positioned on the printed circuit board and interconnected to plated throughholes 686. Thus, input-output to pin terminals 682 can control brushes 672, 674, to control the electromagnet, and input current to terminals 690, to control the motor.

Figure 50:
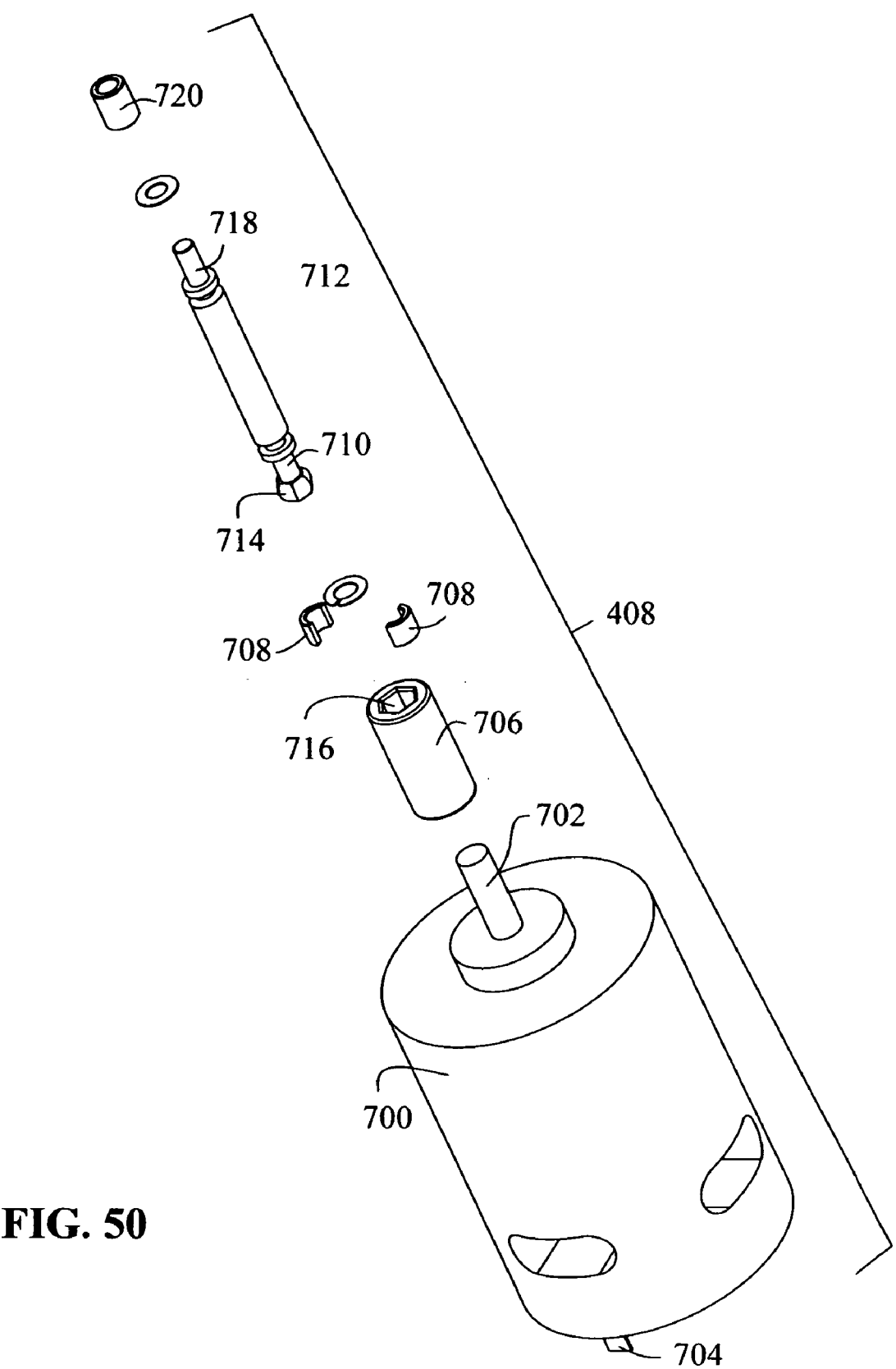
FIG. 50 shows an enlarged view of the motor drive assembly.

With respect now to FIG. 50, motor assembly 408 is generally comprised of an electric motor 700 having an output shaft at 702 and electrical tab terminals at 704. A floating coupling is included at 706 having a split bearing 708, which is received over end 710 of gear 712. Drive end 714 of gear 712 is driven by hexagonal opening 716 of coupling 706, and shaft end 718 of gear 712 receives a bearing 720. With all the various components now described, the assembly of the actuator will now be described.

Figure 38:
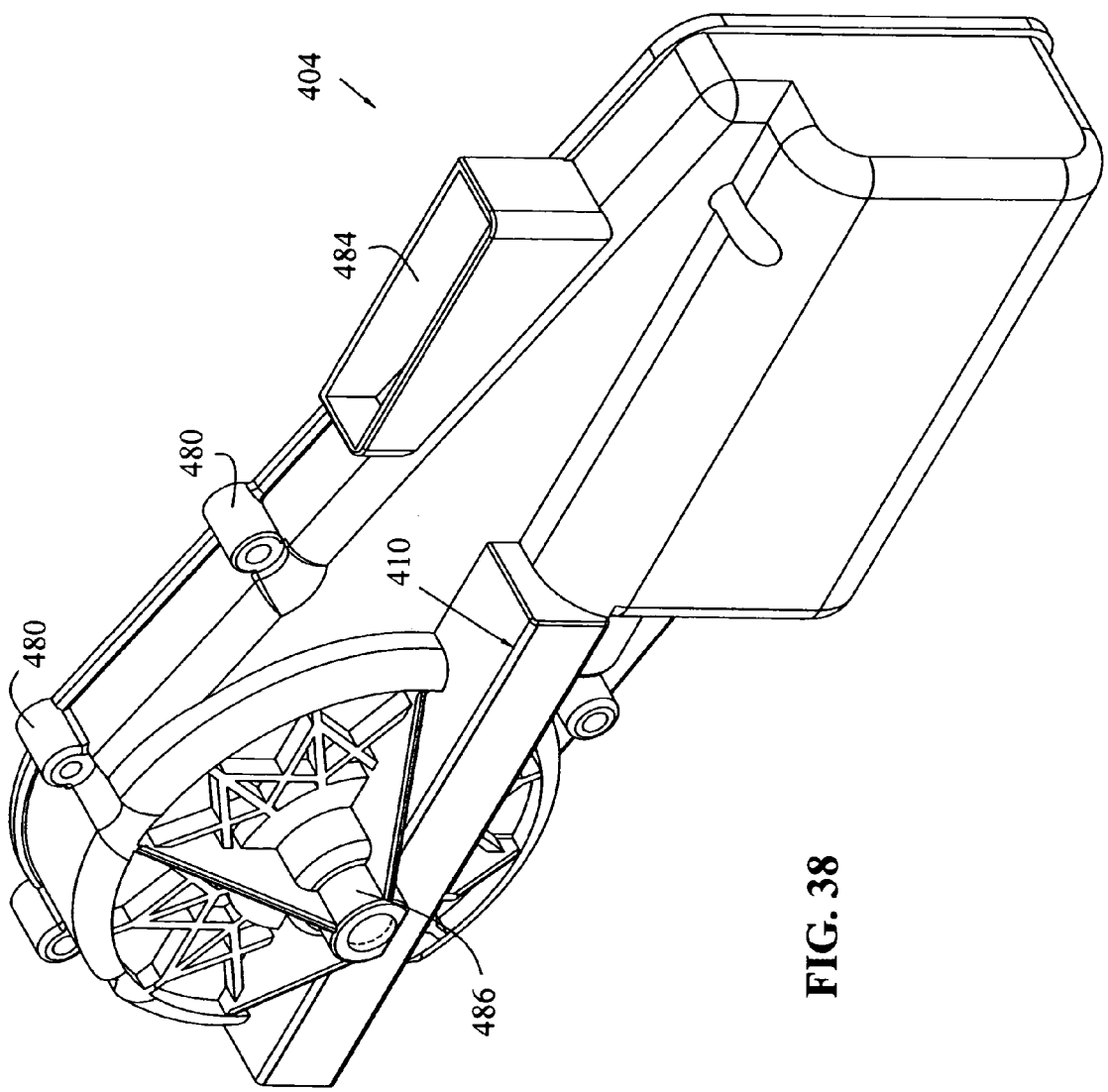
FIG. 38 shows an outer perspective view of the housing portion of FIGS. 36 and 37.
Figure 40:
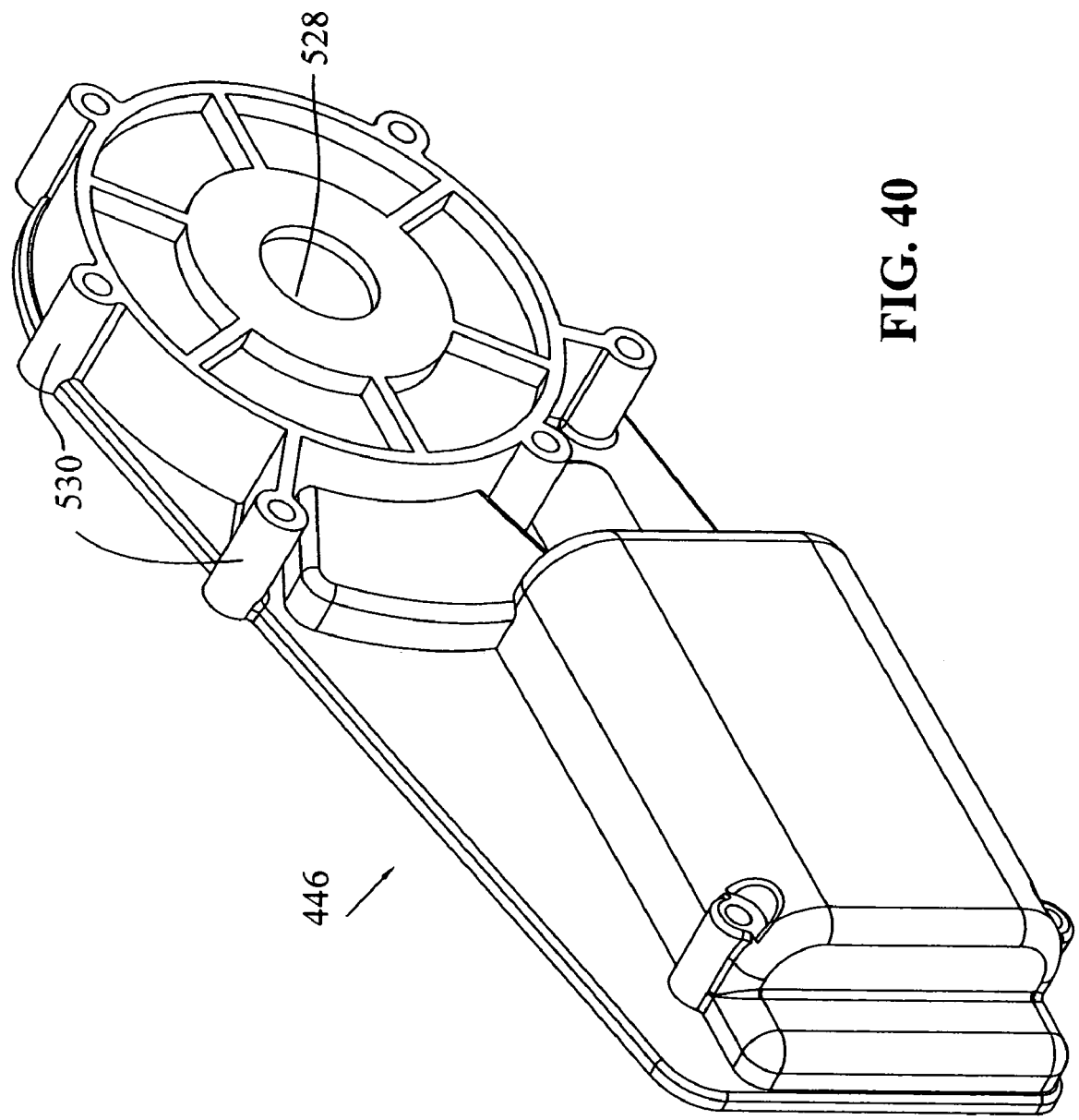
FIG. 40 shows an outside perspective view of the cover portion shown in FIG. 39.

As mentioned above, main housing portion 404 is molded such that shaft 416 is integrally molded therein. Splined end 652 (FIG. 47) of shaft 416 is integrally molded within the hub portion 486 (FIG. 8) to be integrally fixed therein. This defines the housing portion 404, as shown in FIGS. 36 through 38. Cover portion 446 is also molded to define the cover as shown in FIGS. 39 and 40. With respect now to FIGS. 42 and 45, rotor assembly 430 will be described.

As mentioned above, outer ring gear 580 is integrally molded over rotor 540 to encapsulate the radial ribs 544. Bobbin member 426 is now positioned within the cavity portion 550, ensuring that the winding ends 624 extend through slot 546. As best shown in FIG. 45, slot 546 aligns with one of the apertures 592, and therefore contact ring assembly 437 is positioned relative to the assembly, such that contact ring contact 612 aligns with slot 546. This allows contact ring 602 to be interconnected to one of the windings 624 by way of the contact portion 612. It should be appreciated that contact portion 612 could include any well-known terminating portion, such as a magnet wire electrical contact, or any other suitable contact. Thus, both contact rings 421 and 437 are snapped in place, as described above, locking the rings 421 and 437 to the ring gear 580 and with each of the contact rings 602 interconnected to terminating wire ends 624. This contact is best shown in the cross-sectional view of FIG. 54.

Rack 412 (FIG. 52) is now received in the rack slide 410 (FIG. 35) and first clutch plate 420 is positioned over shaft 416. This allows gear 634 to mesh with the rack teeth of rack gear 412. This engagement is shown best in FIG. 52. Snap ring 423 is now positioned within its groove 654 (FIG. 36) and washer 425 is placed over the shaft on the back side of snap ring 423. Rotor assembly 430 is now positioned over shaft 416, with hub portion 540 (FIG. 42) being positioned adjacent to rear face 636 of first clutch plate 420. Thrust rods 432 are now positioned in the throughbores 556 (FIG. 45) and are projected inwardly until a contact the backface 636 of first clutch plate 420. Snap ring 436 is now assembled over shaft 416 in its associated groove 656 (FIG. 56), thereby axially retaining the rotor assembly 430 on shaft 416. Second clutch plate 442 may now be slidably received over shaft 416 and thrust washer 444, flanked by thrust washer 445 is positioned over hub portion 647 (FIG. 43).

Control board 448 is now positioned in housing 404, such that brushes 672, 674 (FIG. 49) are positioned adjacent to their associated contact portions 602 (FIG. 42). This also positions contact portions 690 adjacent to bearing wall portion 452. The motor assembly 408 can now be positioned into its associated receiving section, as described herein.

As shown in FIG. 51, the motor assembly 408 can be received in a straight downwardly position, with the assembly 408 received in the housing 404. Motor 700 is positioned in its associated cavity, with drive sleeve 706 positioned within its opening 456, bearing 708 positioned in its opening 458, gear 712 positioned in its opening 460, and end bearing 720 positioned in its opening 462. This positions the outer helical gear of 712 in meshing engagement with the teeth of ring gear 586. Furthermore, with the motor 408 installed as described, tab terminals 704 extending from motor 700 are received in their associated contacts 690 of the printed circuit board 670. It should also be appreciated that the pin contact portions 682 (FIG. 49) would be positioned in opening 484 and profiled for interconnection with a mating electrical connector.

The device is now assembled as shown in FIG. 51, and a further thrust washer 445 (FIG. 41) can be placed over the compression spring 444 and cover 446 placed over the assembly. Screws such as 750 can be positioned through bosses 530 of cover portion 446 (FIG. 39) and be received within threaded openings of bosses 480. Finally, a bowden cable assembly 414 (FIG. 52) is received in a slotted opening of rack 412, and a cover plate 752 is received over opening 754 (FIG. 37) and fixed thereto. In this embodiment, the cover 752 is ultrasonically welded to opening 754. This positions bowden cable interconnected to the rack but projected through opening 756 (FIG. 35) of rack slide 410. With the actuator as assembled, the operation will now be described with respect to FIGS. 53A and 53B.

Figure 53A:
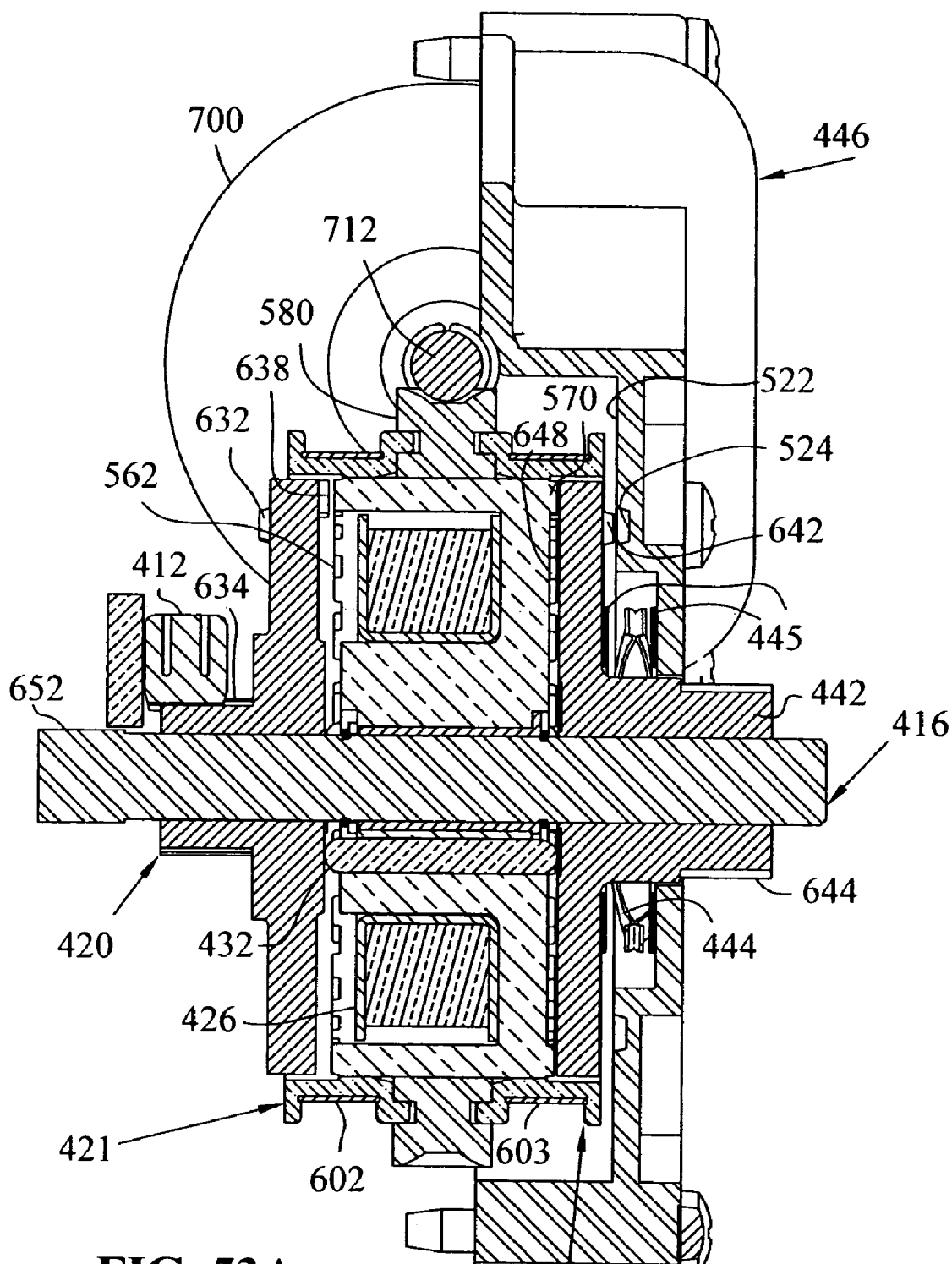
FIG. 53A is a cross-sectional view taken through lines 53—53 of FIG. 2 in the normally operated position, where the electromagnet is not operated.

FIG. 53A shows the device in the normally operated position, where the magnet is not energized. In this configuration, compression spring 444 causes a thrust against second clutch plate 442, causing a spacing between clutch plate 442 and inner surface 522 of cover 446. This prevents the engagement between lugs 642 and apertures 524 and at the same time, causes engagement between lugs 570 and 648. The thrust of compression spring 444 against clutch plate 442 also causes the movement of thrust rods 432 within the rotor, pushing against first clutch plate 420, preventing engagement between their corresponding interlocking lugs 562 and 638. Thus, when gear 712 meshes with ring gear 580, the output is to gear 644 by way of a rotary output.

Figure 53B:
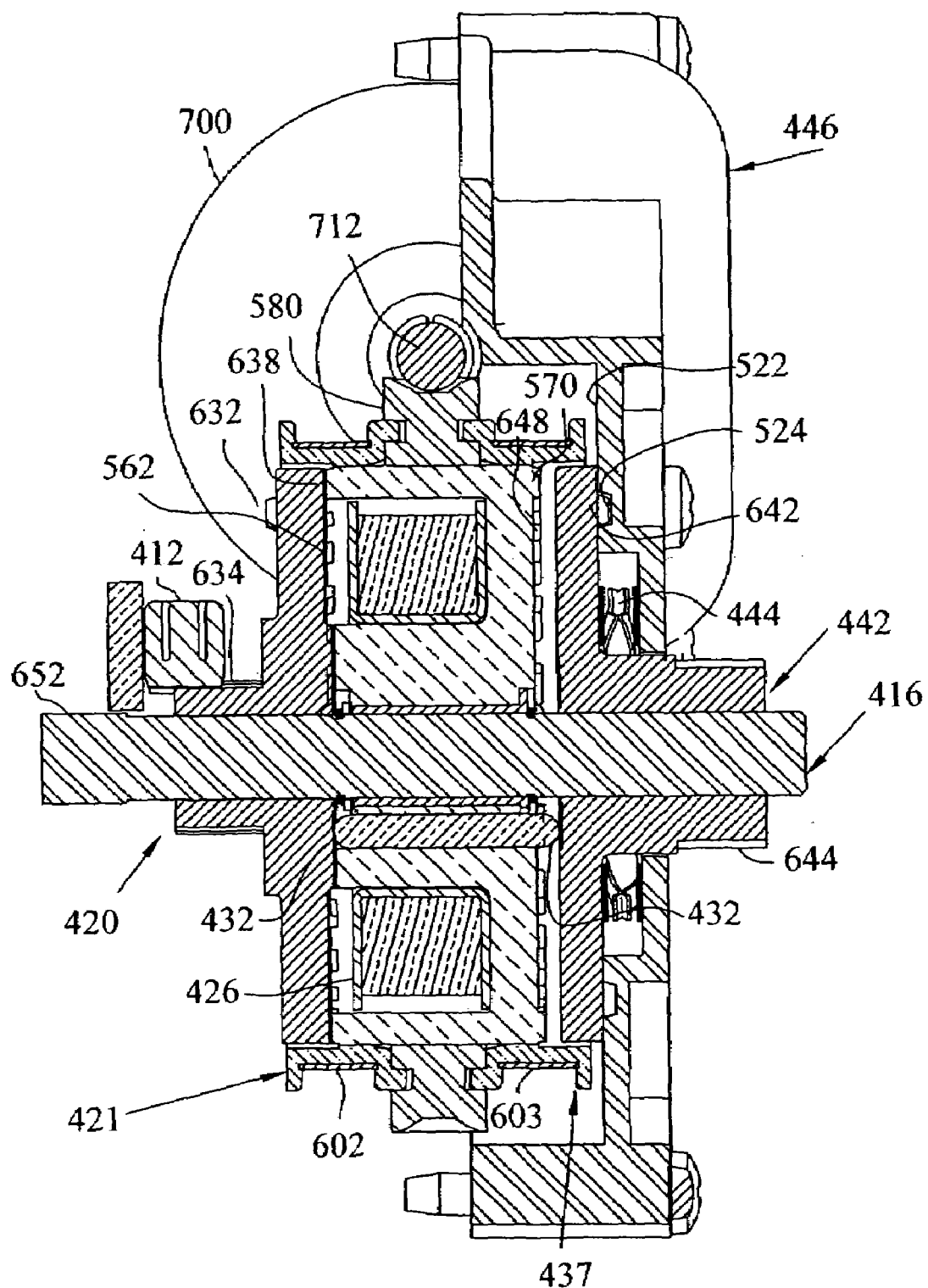
FIG. 53B is a view similar to that of FIG. 53A with the electromagnet energized.
Figure 54:
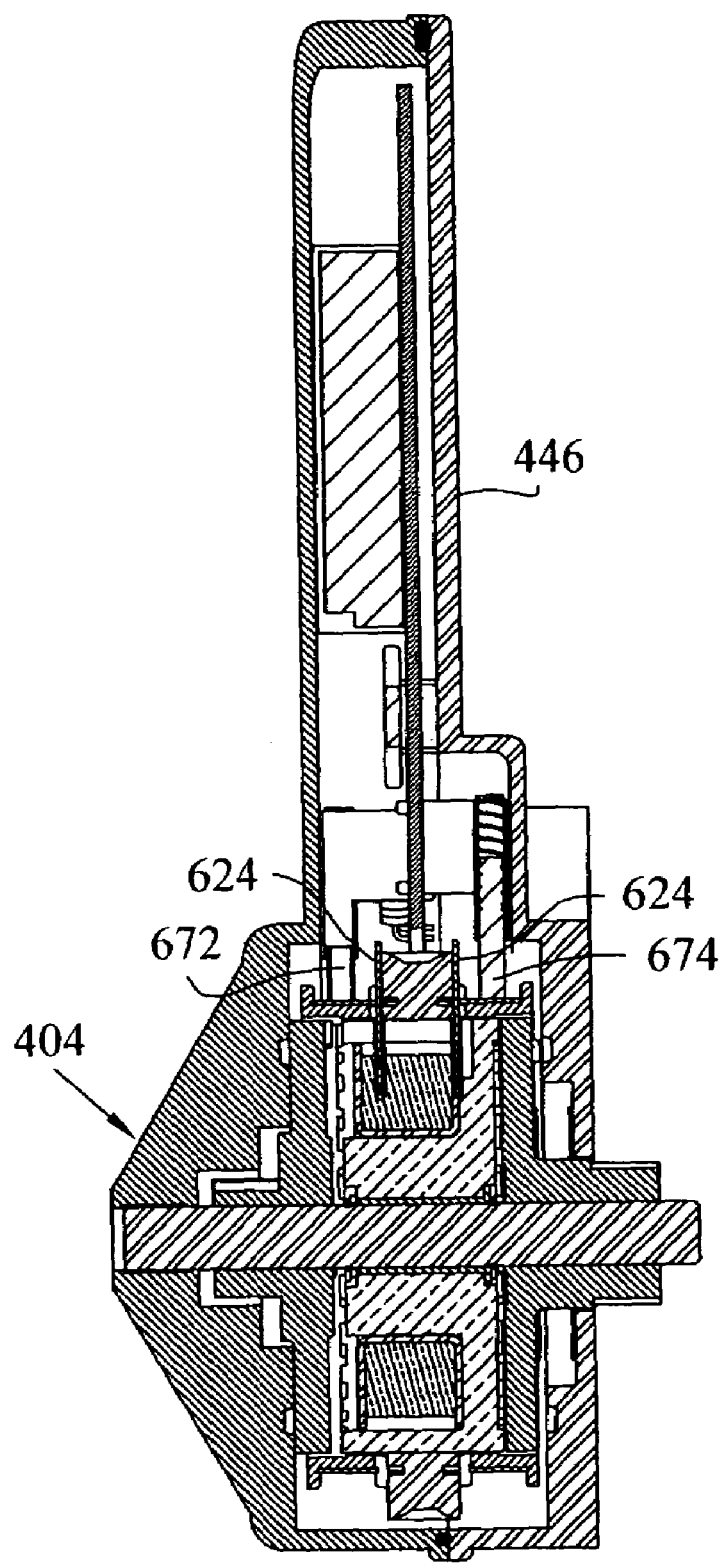
FIG. 54 is a cross-sectional view through lines 54—54 of FIG. 35.

However, if a linear output is required, electromagnet is energized, causing the magnetic attraction between first clutch plate 420 and ferromagnetic rotor 540, causing the inter-engagement between respective lugs 562 and 638, as shown in FIG. 53B. At the same time, the movement of clutch plate 420 causes movement of thrust rods 432 against clutch plate 442, compressing spring 444 and disengaging interlocking lugs 570 and 648, while at the same time engaging lugs 562 and 638. Thus, driving gear 712 against ring gear 580 causes the rotation of the second clutch plate 420, which drives rack 412 and resultantly bowden cable 414.

What is claimed is:

1. A drive assembly, for alternate rotational and linear output, the assembly comprising:
   an input power source providing rotational input;
   a clutch assembly having a driven portion, driven by said input power source, and at least two output driving portions, a first of said output driving portions being linear output and a second of said output driving portions being rotational output; said driven portion of said clutch assembly is a ring gear, and said input power source drives said ring gear, and said first and second output driving portions are first and second clutch plates positioned on opposite sides of said ring gear;

a first housing portion, and a shaft attached to said first housing portion, said ring gear and said first and second clutch plates being rotationally positioned on said shaft; said ring gear defines an electromagnet, to draw one of said clutch plates into driving engagement with said ring gear, such that when said magnet is energized, said one clutch plate is drawn into engagement with said ring gear and is driven by said ring gear;

said second clutch plate is spring loaded into engagement with said ring gear, for normal driving engagement with said ring gear, when said electromagnet is not energized, and said first clutch plate, when said electromagnet is energized, comes into driving engagement with said ring gear, and said second clutch plate is disengaged; and wherein said second clutch plate is disengaged by the lateral movement of said first clutch plate.

2. The drive assembly of claim 1, wherein said input power source is an electric motor, having a splined output drive to drive an exterior periphery of said ring gear.

3. The drive assembly of claim 1, wherein said assembly includes laterally movable drive pins extending between said first and second clutch plates and through said ring gear, whereby when said electromagnet is disengaged, said spring providing a force on said second clutch plate causing engagement of said second clutch plate against said ring gear, and said second clutch plate is driven by said ring gear, and said drive pins are engaged by said second clutch plate, and engage said first clutch plate maintaining said first clutch plate in a disengaged position; and whereby, when said electromagnet is energized, said first clutch plate moves laterally towards and against said ring gear, and forcing said drive pins in an opposite position to force said second clutch plate out of engagement with said ring gear.

4. The drive assembly of claim 1, wherein said first clutch plate has output gear teeth in constant meshing engagement with a linear rack, whereby when said first clutch plate is driven by activation of said electromagnet, said rack provides linear output.

5. The drive assembly of claim 1, wherein said second clutch plate has output gear teeth, whereby when said second clutch plate is driven, said second clutch plate provides rotational output.

6. The drive assembly of claim 1, wherein said input power source is an electric motor, having a splined output drive to drive an exterior periphery of said ring gear, and further comprising a second housing portion, said first and second housing portions enclosing said electric motor therein.

7. The drive assembly of claim 6, wherein said ring gear is comprised of a ferromagnetic material and has a bobbin of magnetic wire windings positioned within a core of said ring gear.

8. The drive assembly of claim 7, further comprising a control circuit board having brushes mounted thereon in contact with said contact rings.

9. The drive assembly of claim 7 wherein said housing assembly includes an input-output port, and electrical terminals are positioned proximate said port, and electrically connected to said brushes for activation of said electromagnet.

10. A drive assembly, for alternate rotational and linear output, the assembly comprising:

an input power source providing rotational input;

a clutch assembly having a driven portion, driven by said input power source, and at least two output driving portions, a first of said output driving portions being linear output and a second of said output driving portions being rotational output, wherein said driven portion of said clutch assembly is a ring gear, and said input power source drives said ring gear, and said first and second output driving portions are first and second clutch plates positioned on opposite sides of said ring gear;

a first housing portion, and a shaft attached to said first housing portion, said ring gear and said first and second clutch plates being rotationally positioned on said shaft;

said ring gear defines an electromagnet, to draw one of said clutch plates into driving engagement with said ring gear, such that when said magnet is energized, said one clutch plate is drawn into engagement with said ring gear and is driven by said ring gear;

said input power source is an electric motor, having a splined output drive to drive an exterior periphery of said ring gear, and further comprising a second housing portion, said first and second housing portions enclosing said electric motor therein;

said ring gear is comprised of a ferromagnetic material and has a bobbin of magnetic wire windings positioned within a core of said ring gear;

said windings terminate to contact rings on an outer diameter of said ring gear.

11. An electromagnetic clutch drive assembly, comprising:

a central shaft;

a ring gear assembly, rotatably mounted to said shaft and comprised of a ferromagnetic rotor member, said rotor member having an open core portion, a ring gear positioned on an external circumferential periphery of said rotor, a bobbin of magnetic wire windings positioned within said core of said ring gear, and contacts to energize said wind ings to define a magnetic field;

a first clutch plate rotatably mounted to said shaft and positioned on a first side of said ring gear assembly, and being normally in a disengaged position with said ring gear assembly;

a second clutch plate rotatably mounted to said shaft and positioned on an opposite side of said ring gear assembly as said first clutch plate, and being in normal contact with said ring gear assembly; and engagement members extending between said first and second clutch plates, whereby the lateral shifting of one of said clutch plates causes the lateral shifting of the other of said clutch plates out of engagement with said ring gear assembly;

whereby, said ring gear defines an electromagnet to draw one of said clutch plates into driving engagement with said ring gear, such that when said wind ings are energized, said one clutch plate is drawn into engagement with said ring gear and is driven by said ring gear.

12. The electromagnetic clutch drive assembly of claim 11, wherein said second clutch plate is spring loaded into engagement with said rotor member, for normal driving engagement with said rotor member, when said electromagnet is not energized.

13. The electromagnetic clutch drive assembly of claim 12, wherein said first clutch plate, when said electromagnet is energized, comes into driving engagement with said rotor member, and said second clutch plate is disengaged.

14. The electromagnetic clutch drive assembly of claim 13, wherein said engagement members include laterally movable drive pins extending between said first and second clutch plates and through said rotor member, whereby
when said electromagnet is disengaged said spring loading on said second clutch plate causes engagement of said second clutch plate against said rotor member, and said second clutch plate is driven by said rotor member, and said drive pins are engaged by said second clutch plate, and engage said first clutch plate maintaining said first clutch plate in a disengaged position; and whereby, when said electromagnet is energized, said first clutch plate moves laterally towards and against said rotor member, and forcing said drive pins in an opposite position to force said second clutch plate out of engagement with said rotor member.

15. The electromagnetic clutch drive assembly of claim 11, further comprising an input power source to drive said rotor member assembly, said input power source comprising an electric motor, having a splined output drive to drive said ring gear.

16. The electromagnetic clutch drive assembly of claim 15, wherein said assembly further comprises a first housing portion with said shaft attached to said first housing portion.

17. The electromagnetic clutch drive assembly of claim 15, further comprising a second housing portion, said first and second housing portions enclosing said electric motor therein.

18. The electromagnetic clutch drive assembly of claim 11, wherein said first and second clutch plates provide alternate rotational and linear output.

19. The electromagnetic clutch drive assembly of claim 18, wherein said first clutch plate has output gear teeth in constant meshing engagement with a linear rack, whereby when said first clutch plate is driven by activation of said electromagnet, said rack provides linear output.

20. The electromagnetic clutch drive assembly of claim 19, wherein said second clutch plate has output gear teeth, whereby when said second clutch plate is driven, said second clutch plate provides rotational output.

21. An electromagnetic clutch drive assembly, comprising:
a housing assembly, comprised of a main housing portion and a cover portion;
a central shaft positioned within said housing assembly;
an input power source providing rotational input;
an electromagnetic clutch assembly having a driven portion, driven by said input power source, and at least two output driving portions, a first of said output driving portions being linear output and a second of said output driving portions being rotational output, whereby activation of an electromagnet of said electromagnetic clutch assembly controls the output between the first and second output driving portions;
said driven portion of said clutch assembly is a ring gear assembly and said input power source drives said ring gear assembly;
said input power source is an electric motor, having a splined output drive to drive an exterior periphery of said ring gear assembly;
said first and second output driving portions are first and second clutch plates positioned on opposite sides of said ring gear assembly;
said ring gear assembly defines said electromagnet, to draw one of said clutch plates into driving engagement with said ring gear assembly, such that when said electromagnet is energized, said one clutch nlate is drawn into engagement with said ring gear assembly and is driven by said ring gear assembly;
said ring gear assembly is comprised of ferromagnetic rotor member, said rotor member having an open core portion, a ring gear positioned on an external circumferential periphery of said rotor, a bobbin of magnetic wire windings positioned within said core of said ring gear, and contacts to energize said windings to define a magnetic field; and
wherein said main housing portion and cover portion have internal surfaces proximate to said first and second clutch plates.

22. The electromagnetic clutch drive assembly of claim 21, wherein said shaft is integrally molded within said main housing portion.

23. The electromagnetic clutch drive assembly of claim 21, wherein said first and second clutch plates have exterior surfaces proximate said internal surfaces of said main housing portion and cover portion, said internal surfaces of said main housing portion and cover portion being substantially parallel with said exterior surfaces of said first and second clutch plates.

24. The electromagnetic clutch drive assembly of claim 23, wherein a width of said first and second clutch plates combined with said rotor is less than a width intermediate said internal surfaces of said main housing portion and cover portion, whereby said first and second clutch plates can either be positioned flush with said rotor or flush with said internal surfaces of said main housing portion.

25. The electromagnetic clutch drive assembly of claim 24, wherein said first and second clutch plates and rotor member have interlocking members to alternatively interlock said first clutch plate to said rotor or alternatively lock said second clutch plate to said rotor.

26. The electromagnetic clutch drive assembly of claim 25, further comprising engagement members extending between said first and second clutch plates, whereby the lateral shifting of one of said clutch plates causes the lateral shifting of the other of said clutch plates out of engagement with said rotor.

27. The electromagnetic clutch drive assembly of claim 26, wherein said engagement members include laterally movable drive pins extending between said first and second clutch plates and through said rotor member.

28. The electromagnetic clutch drive assembly of claim 27, wherein said internal surfaces of said main housing portion and said cover portion, and said external surfaces of said first and second clutch plates have interlocking engagement portions, whereby when said electromagnet is disengaged said spring loading on said second clutch plate causes interengagement of said second clutch plate against said rotor member, and said second clutch plate is driven by said rotor member, and said drive pins are engaged by said second clutch plate, and engage said first clutch plate maintaining said first clutch plate in a disengaged position with the first clutch plate interlocked to an internal surface of said main housing portion; and whereby, when said electromagnet is energized, said first clutch plate magnetically moves laterally towards and into interlocking engagement with said rotor member, and forcing said drive pins in an opposite direction to force said second clutch plate out of engagement with said rotor member and into interengagement with the internal surface of said cover portion.

29. A drive assembly, for alternate rotational and linear output, comprising an input power source providing rotational input, the assembly further comprises a clutch assembly having a driven portion, driven by said input power source, and at least two output driving portions, a first of said output driving portions being linear output and a second of said output driving portions being rotational output; the engagement of either the first output driving portion or the second output driving portion and disengagement of the other of the first output driving portion or second output driving portion is accomplished by movement of one of the first output driving portion or the second output driving portion.

30. The drive assembly of claim 29, wherein said driven portion of said clutch assembly is a ring gear, and said input power source drives said ring gear.

31. The drive assembly of claim 30, wherein said input power source is an electric motor, having a splined output drive to drive an exterior periphery of said ring gear.

32. The drive assembly of claim 30, wherein said first and second output driving portions are first and second clutch plates positioned on opposite sides of said ring gear.

33. The drive assembly of claim 32, wherein said assembly further comprises a first housing portion, and a shaft attached to said first housing portion, said ring gear and said first and second clutch plates being rotationally positioned on said shaft.

34. The drive assembly of claim 33, wherein said ring gear defines an electromagnet, to draw one of said clutch plates into driving engagement with said ring gear, such that when said magnet is energized, said one clutch plate is drawn into engagement with said ring gear and is driven by said ring gear.

35. The drive assembly of claim 34, wherein said input power source is an electric motor, having a splined output drive to drive an exterior periphery of said ring gear, and further comprising a second housing portion, said first and second housing portions enclosing said electric motor therein.

36. The drive assembly of claim 34, wherein said second clutch plate is spring loaded into engagement with said ring gear, for normal driving engagement with said ring gear, when said electromagnet is not energized.

37. The drive assembly of claim 36, wherein said first clutch plate, when said electromagnet is energized, comes into driving engagement with said ring gear, and said second clutch plate is disengaged.

38. The drive assembly of claim 37, wherein said second clutch plate is disengaged by the lateral movement of said first clutch plate.

39. The drive assembly of claim 38, wherein said assembly includes laterally movable drive pins extending between said first and second clutch plates and through said ring gear, whereby when said electromagnet is disengaged, said spring providing a force on said second clutch plate causing engagement of said second clutch plate against said ring gear, and said second clutch plate is driven by said ring gear, and said drive pins are engaged by said second clutch plate, and engage said first clutch plate maintaining said first clutch plate in a disengaged position; and whereby, when said electromagnet is energized, said first clutch plate moves laterally towards and against said ring gear, and forcing said drive pins in an opposite position to force said second clutch plate out of engagement with said ring gear.

40. The drive assembly of claim 37, wherein said first clutch plate has output gear teeth in constant meshing engagement with a linear rack, whereby when said first clutch plate is driven by activation of said electromagnet, said rack provides linear output.

41. The drive assembly of claim 37 wherein said second clutch plate has output gear teeth, whereby when said second clutch plate is driven, said second clutch plate provides rotational output.

42. The drive assembly of claim 30 wherein said ring gear is comprised of a ferromagnetic material and has a bobbin of magnetic wire windings positioned within a core of said ring gear.

43. The drive assembly of claim 42, wherein said windings terminate to contact rings on an outer diameter of said ring gear.

44. The drive assembly of claim 43, characterized by a control circuit board having brushes mounted thereon in contact with said contact rings.

45. The drive assembly of claim 44 wherein said housing assembly includes an input-output port, and electrical terminals are positioned proximate said port, and electrically connected to said brushes for activation of said electromagnet.

* * * * *